(12) United States Patent
Fujino et al.

(10) Patent No.: US 7,228,260 B2
(45) Date of Patent: Jun. 5, 2007

(54) ROLE-PLAYING SIMULATION APPARATUS AND METHOD, AND COMPUTER PRODUCT

(75) Inventors: Akio Fujino, Tokyo (JP); Masaru Nakagaki, Tokyo (JP); Hiroshi Hatakama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 666 days.

(21) Appl. No.: 10/355,055

(22) Filed: Jan. 31, 2003

(65) Prior Publication Data
US 2004/0014020 A1  Jan. 22, 2004

(30) Foreign Application Priority Data
Jul. 22, 2002  (JP)  ............................. 2002-212984

(51) Int. Cl.
*G06F 9/455* (2006.01)
(52) U.S. Cl. .................. 703/6; 379/265.05; 705/37; 463/30; 463/9; 463/31
(58) Field of Classification Search ............... 703/6; 705/37; 379/265.05; 463/30, 25, 9, 31; 707/100; 273/255, 292; 434/236, 362
See application file for complete search history.

(56) References Cited

U.S. PATENT DOCUMENTS

| | | | | |
|---|---|---|---|---|
| 2002/0146676 | A1* | 10/2002 | Reynolds | 434/362 |
| 2002/0160835 | A1* | 10/2002 | Fujioka et al. | 463/31 |
| 2002/0198033 | A1* | 12/2002 | Wen et al. | 463/9 |
| 2003/0017439 | A1* | 1/2003 | Rapoza et al. | 434/236 |
| 2003/0094759 | A1* | 5/2003 | Niedner et al. | 273/255 |
| 2003/0104860 | A1* | 6/2003 | Cannon et al. | 463/25 |
| 2003/0137107 | A1* | 7/2003 | Rubin | 273/292 |
| 2003/0156706 | A1* | 8/2003 | Koehler et al. | 379/265.05 |
| 2003/0233305 | A1* | 12/2003 | Solomon | 705/37 |

(Continued)

FOREIGN PATENT DOCUMENTS

JP  08-227264  9/1996

(Continued)

OTHER PUBLICATIONS

Hamalainen et al., "Towards decision and negotiation support in multi-stakeholder development of lake regulation policy", IEEE, 1999.*

(Continued)

*Primary Examiner*—Paul Rodriguez
*Assistant Examiner*—K Thangavelu
(74) *Attorney, Agent, or Firm*—Staas & Halsey LLP

(57) ABSTRACT

In a role-playing simulation apparatus, a setting section sets a plurality of patterns of parameters indicating characters of player agents who participate in a virtual role-playing and also sets patterns of negotiation rules, and player agent sections realize the player agents. A lecture attendant agent section realizes a lecture attendant agent who carries out virtual negotiations with the player agents, a learning material preparing section allows the player agents and the lecture attendant agent to carry out negotiations, a learning material evaluating section evaluates a negotiation result for each combination and sets a parameter evaluated with at least a predetermined level as a learning material, and a lecture attendance processor that allows the player agents and an actual lecture attendant to execute a virtual role-playing based on the learning material.

7 Claims, 18 Drawing Sheets

U.S. PATENT DOCUMENTS

2004/0006566 A1*  1/2004  Taylor et al. ................ 707/100
2004/0009813 A1*  1/2004  Wind ........................... 463/30

FOREIGN PATENT DOCUMENTS

| JP | 8-227264 | 9/1996 |
| --- | --- | --- |
| JP | 8-227264 A | 9/1996 |
| JP | 10-111804 A | 4/1998 |
| JP | 11-133846 | 5/1999 |
| JP | 11-328243 | 11/1999 |
| JP | 2000-200125 | 7/2000 |

OTHER PUBLICATIONS

Office Action for corresponding Japanese Application No. 2002-212984 dated Jul. 22, 2005.

Notice of Rejection (Office Action) dated Nov. 22, 2005 in connection with corresponding Japanese Patent Application No. 2002-212984.

* cited by examiner

FIG.5

| LEARNING MATERIAL ID | PLAYER AGENT 1 (CUSTOMER INFORMATION SYSTEM DEPARTMENT MANAGER) | | PLAYER AGENT 2 (CUSTOMER INFORMATION SYSTEM STAFF IN CHARGE) | | PLAYER AGENT 3 (SE DEPARTMENT MANAGER OF THE OWN COMPANY) | | PLAYER AGENT 4 (SALES DEPARTMENT MANAGER OF THE OWN COMPANY) | |
|---|---|---|---|---|---|---|---|---|
| | PARAMETER | CHARAC-TER | PARAMETER | CHARAC-TER | PARAMETER | CHARAC-TER | PARAMETER | CHARACTER |
| 001 | 1: TIME OF SYSTEM PROVISION WEIGHT :0.5 REQUIREMENT :1  2: PROVIDED FUNCTION WEIGHT :0.5 REQUIREMENT :1  CONVERGENCE DECISION VALUE: 0.5 | WANTS EARLY AND STABLE PROVISION OF THE WHOLE FUNCTIONS FOR A CUTOVER | 1: TIME OF SYSTEM PROVISION WEIGHT :0.4 REQUIREMENT :1  2: PROVIDED FUNCTION WEIGHT :0.4 REQUIREMENT :1  CONVERGENCE DECISION VALUE: 0.4 | WANTS EARLY AND STABLE PROVISION OF WHOLE FUNCTIONS FOR CUTOVER. ALSO ANXIOUS ABOUT SATISFACT-ION LEVEL OF CUSTOMER INFOR-MATION SYSTEM DEPART-MENT MANAGER. | 1: TIME OF SYSTEM PROVISION WEIGHT :0.5 REQUIREMENT :0  2: PROVIDED FUNCTION WEIGHT :0.5 REQUIREMENT :0  CONVERGENCE DECISION VALUE: 0.3 | WANTS TO DELAY PROVISION. ALSO WANTS TO LIMIT PART OF FUNCTION. | 1: TIME OF SYSTEM PROVISION WEIGHT :0.5 REQUIREMENT :0  2: PROVIDED FUNCTION WEIGHT :0.5 REQUIREMENT :0  CONVERGENCE DECISION VALUE: 0.3 | REGARDS SATISFACTION LEVEL OF CUSTOMER INFORMATION SYSTEM DEPARTMENT MANAGER MOST IMPORTANT, TOWARD COMMERCIAL NEGOTIATION OF NEXT-GENERATION SYSTEM. ALSO ANXIOUS ABOUT SATISFACTION LEVEL OF SE DEPARTMENT MANAGER OF THE OWN COMPANY. |
| 002 | .. | .. | .. | .. | .. | .. | .. | .. |
| 003 | .. | .. | .. | .. | .. | .. | .. | .. |
| 004 | .. | .. | .. | .. | .. | .. | .. | .. |

| RULE | RULE DEFINITION | RULE CONTENTS |
|---|---|---|
| R1 | · SATISFACTION LEVEL OF PLAYER AGENT 1 < 0.2 → EXPLAIN ○○<br>· SATISFACTION LEVEL OF PLAYER AGENT 2 < 0.3 → HEARING ABOUT ×× <br>.... | · WHEN SATISFACTION LEVEL OF PLAYER AGENT 1 IS LOW, TAKE ACTION TO EXPLAIN ○○<br>· WHEN SATISFACTION LEVEL OF PLAYER AGENT 2 IS LOW, TAKE ACTION TO INQUIRE ABOUT ×× AND GET INFORMATION<br>.... |
| R2 | .. | .. |
| R3 | .. | .. |

FIG.7

| NUMBER OF TIMES OF ACTIONS | ACTION | APPLICATION RULE | PROPOSAL VALUE | | | PLAYER AGENT 1 | | | | | PLAYER AGENT 2 | | | |
|---|---|---|---|---|---|---|---|---|---|---|---|---|---|---|
| | | | TIME OF SYSTEM PROVISION | PROVIDED FUNCTION | UNDERSTANDING LEVEL | REQUIREMENT | | NEGOTIATION PROCESS SATISFACTION LEVEL | SATISFACTION LEVEL | UNDERSTANDING LEVEL | REQUIREMENT | | NEGOTIATION PROCESS SATISFACTION LEVEL | SATISFACTION LEVEL |
| | | | | | | TIME | FUNCTION | | | | TIME | FUNCTION | | |
| INITIAL VALUE | | | | | 0 | 1 | 1 | | | 0 | 1 | 1 | | |
| 1 | EXPLANATION (A1) | R1 | | | 0.2 | 0.9 | 0.9 | 0.5 | | 0 | 1 | 1 | 0.5 | |
| 2 | HEARING (A1) | R1 | | | 0.2 | 0.9 | 0.9 | 0.6 | | 0 | 1 | 1 | 0.5 | |
| | | | | | | | | 0.6 | | | | | | |

| RULE COMBINATION | LEARNING MATERIAL 1 (LEARNING MATERIAL ID = 001) | | | LEARNING MATERIAL 2 (LEARNING MATERIAL ID = 002) | | | LEARNING MATERIAL 3 (LEARNING MATERIAL ID = 003) | | | LEARNING MATERIAL 4 (LEARNING MATERIAL ID = 004) | | |
|---|---|---|---|---|---|---|---|---|---|---|---|---|
| | AVERAGE NUMBER OF TIMES UNTIL CONVERGENCE (MINIMUM NUMBER OF TIMES) | NUMBER OF TIMES OF NON-CONVERGENCE | NUMBER OF TIMES OF CONVERGENCE | AVERAGE NUMBER OF TIMES UNTIL CONVERGENCE (MINIMUM NUMBER OF TIMES) | NUMBER OF TIMES OF NON-CONVERGENCE | NUMBER OF TIMES OF CONVERGENCE | AVERAGE NUMBER OF TIMES UNTIL CONVERGENCE (MINIMUM NUMBER OF TIMES) | NUMBER OF TIMES OF NON-CONVERGENCE | NUMBER OF TIMES OF CONVERGENCE | AVERAGE NUMBER OF TIMES UNTIL CONVERGENCE (MINIMUM NUMBER OF TIMES) | NUMBER OF TIMES OF NON-CONVERGENCE | NUMBER OF TIMES OF CONVERGENCE |
| R1 | 311(100) | 130 | 20 | 428(318) | 54 | 96 | 267(255) | 109 | 41 | 298(250) | 30 | 120 |
| R2 | 222(121) | 107 | 43 | 201(91) | 34 | 116 | 18(15) | 2 | 148 | 122(110) | 32 | 118 |
| R1+R2 | 120(111) | 80 | 70 | 78(70) | 25 | 125 | 17(15) | 1 | 149 | 86(70) | 28 | 122 |
| R3 | 91(90) | 40 | 110 | 15(12) | 2 | 148 | 102(95) | 25 | 125 | 54(12) | 10 | 130 |
| R1+R3 | 56(40) | 27 | 123 | 14(12) | 1 | 149 | 89(85) | 21 | 129 | 40(35) | 7 | 143 |
| R2+R3 | 49(48) | 12 | 138 | 12(10) | 1 | 149 | 16(12) | 1 | 149 | 15(14) | 2 | 149 |
| R1+R2+R3 | 11(10) | 0 | 150 | 11(9) | 1 | 149 | 14(10) | 1 | 149 | 14(12) | 1 | 130 |

| LEARNING MATERIAL ID | CLASS | BEST PRACTICE (MINIMUM NUMBER OF TIMES) | RULE |
|---|---|---|---|
| 001 | ADVANCED CLASS | 10 | R1+R2+R3 |
| 002 | ELEMENTARY CLASS | 12 | R3 |
| 003 | ELEMENTARY CLASS | 15 | R4 |
| 004 | INTERMEDIATE CLASS | 14 | R2+R3 |

250

| LECTURE ATTENDANT ID | LECTURE ATTENDANCE DATE | LEARNT LEARNING MATERIAL ID | POINT |
|---|---|---|---|
| 8207440 | 20020104 | 001 | 45 |
| 7909091 | 20010814 | 002 | 68 |
| ⋮ | ⋮ | ⋮ | ⋮ |

260

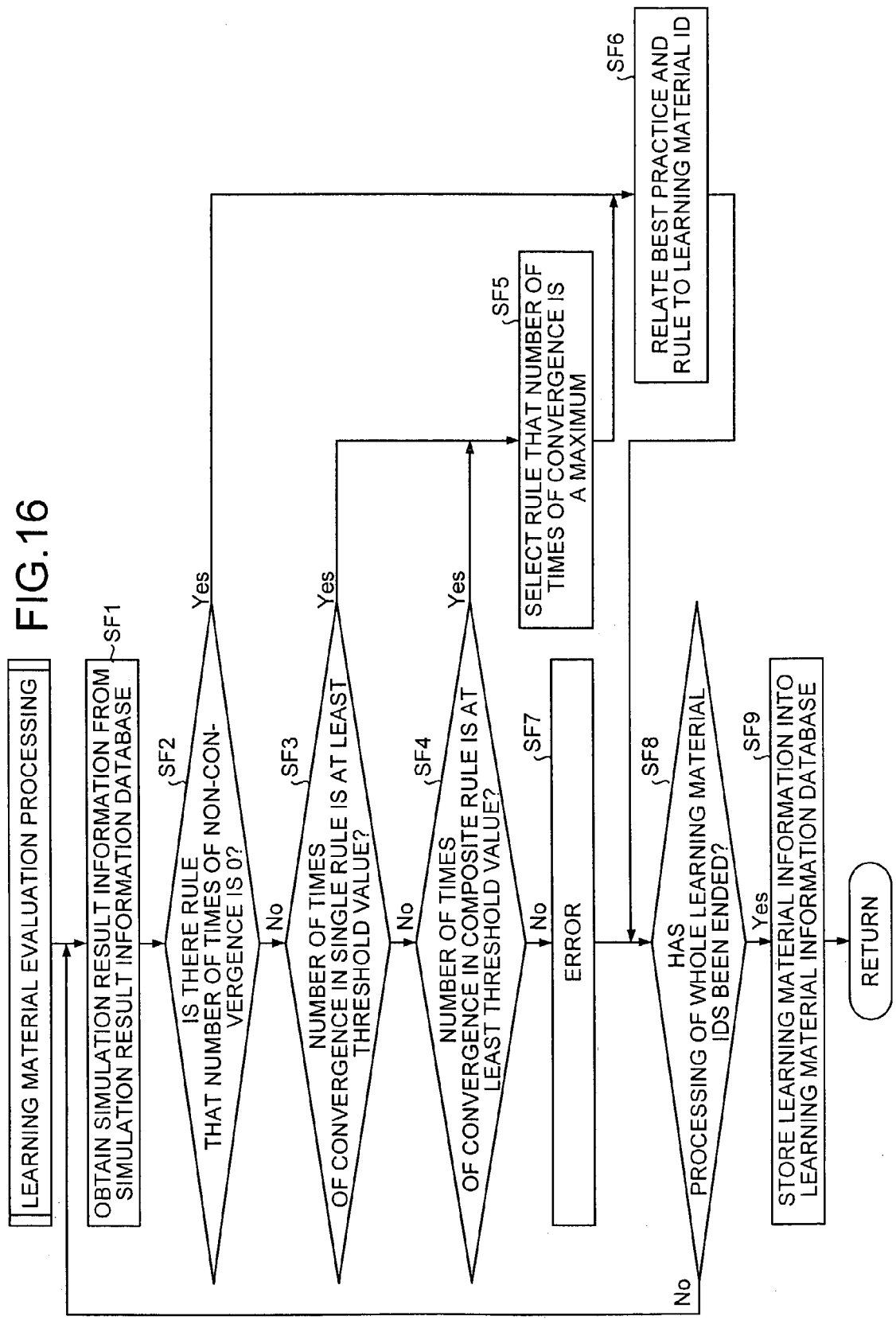

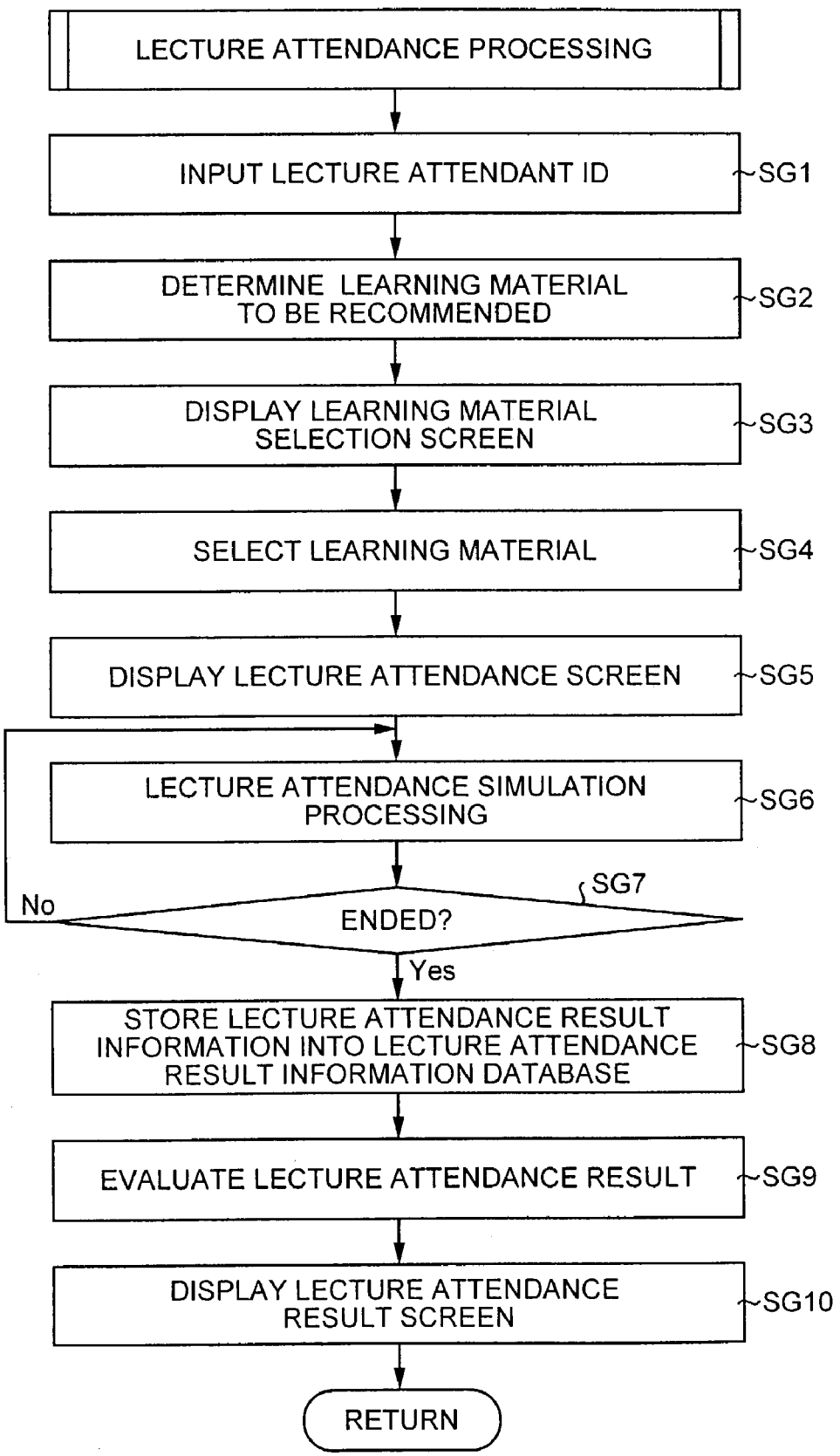

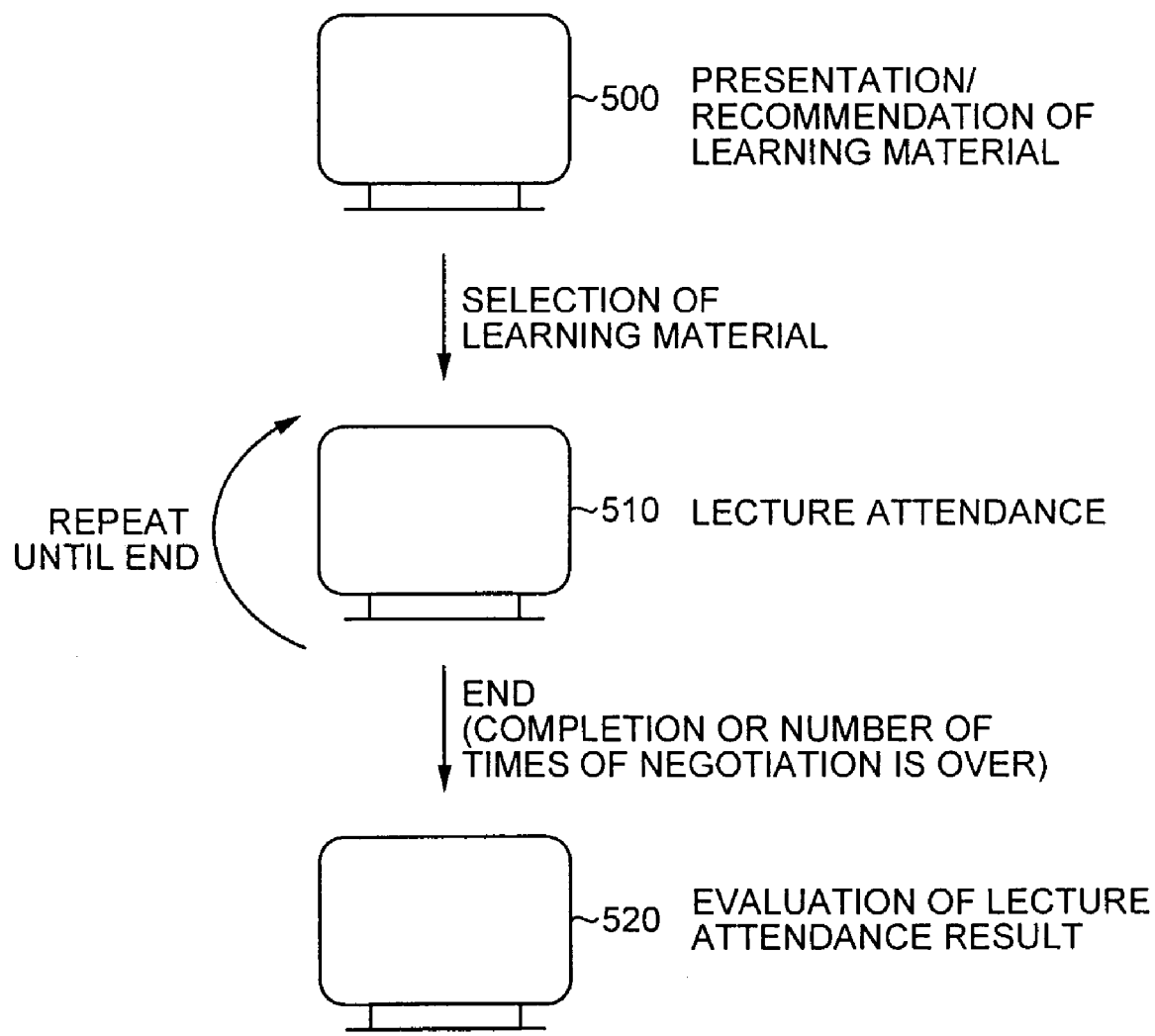

WELCOME, MR. (OR MS.) A (LECTURE ATTENDANT ID = 7909091)

PLEASE SELECT ROLE-PLAYING LEARNING MATERIAL FOR LECTURE ATTENDANCE

THE FOLLOWING KINDS OF ROLE-PLAYING LEARNING MATERIALS ARE PREPARED ACCORDING TO DIFFICULTY LEVELS. PLEASE SELECT A LEARNING MATERIAL.

☐ LEARNING MATERIAL 1 (ADVANCED CLASS)
☐ LEARNING MATERIAL 4 (INTERMEDIATE CLASS)
☐ LEARNING MATERIAL 2 (ELEMENTARY CLASS)
☐ LEARNING MATERIAL 3 (ELEMENTARY CLASS)

WE WILL RECOMMEND YOU TO SELECT THE LEARNING MATERIAL 4 BASED ON YOUR EXPERIENCE (THREE YEARS AS SE) AND LECTURE-ATTENDANCE HISTORY (ATTENDED LECTURE OF THE LEARNING MATERIAL 2).

TO MR. (MS.) A (LECTURE ATTENDANT ID = 7909091)

WE WILL REPORT YOU A RESULT OF YOUR LECTURE ATTENDANCE ON
THE ROLE-PLAYING EDUCATION AS FOLLOWS.

LECTURE ATTENDANCE DATE = 20020421,
LEARNING MATERIAL FOR LECTURE ATTENDANCE = LEARNING MATERIAL 4
YOUR RECORD IS AS FOLLOWS AS COMPARED WITH THE BEST PRACTICE AND OTHER LECTURE ATTENDANTS.

- NUMBER OF TIMES OF ACTIONS TAKEN = 38
- 66% PERFORMANCE AS COMPARED WITH THE BEST PRACTICE (25 TIMES)
- TWENTIETH AMONG 43 LECTURE ATTENDANTS USING THE SAME LEARNING MATERIAL IN THE PAST

AS COMPARED WITH THE LOG OF THE BEST PRACTICE, YOU SHOULD HAVE BEHAVED AS FOLLOWS IN
THE FOLLOWING SCENES. (THIS RECOMMENDATION IS AUTOMATICALLY PREPARED FROM THE DIFFERENCE)

☐ SCENE: 15-TH STEP
☐ DESIRED ACTION: YOU SHOULD HAVE VISITED THE CUSTOMER INFORMATION SYSTEM STAFF IN CHARGE TO EXPLAIN.
☐ EXPLANATION: WHEN RE-PROPOSAL IS NOT MADE AFTER MAKING SUFFICIENT EXPLANATION,
    THE PROPOSAL MAY BE REFUSED.

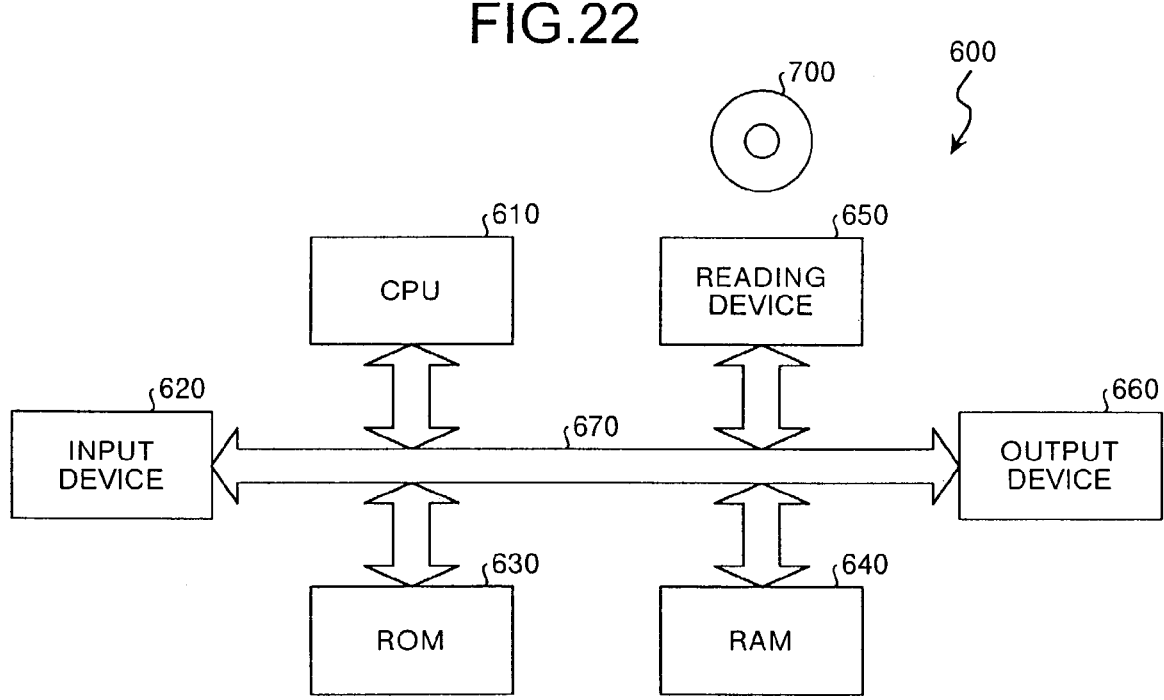

ROLE-PLAYING SIMULATION APPARATUS AND METHOD, AND COMPUTER PRODUCT

BACKGROUND OF THE INVENTION

1) Field of the Invention

The present invention relates to a technology for carrying out a role-playing between virtual players and a lecture attendant by using an agent technique to achieve successful results from education based on the role-playing.

2) Description of the Related Art

Conventionally, in enterprises, staff education according to a role-playing has been carried out in order to develop human resources as project managers or the like. The role-playing is such that pseudo roles are given to a plurality of players based on a preset story and lecture attendants and the players actually carry out negotiations, and that lecturers evaluate the negotiations referring back to the process of the negotiations.

According to the education based on the role-playing that involves participation of actual players, the effect of the education is found largely affected by the quality of members (players) and the story. Further, there are many constraints in terms of time and physical factors.

To solve the problems, the following system has been proposed, that is the system realizes a role-playing on a computer where virtual negotiators and a lecture attendant have conversations. Characters of the virtual negotiators are set based on parameters.

According to the conventional practice of performing the role-playing between the lecture attendant and the virtual negotiators whose characters are set based on parameters, the result of the education is determined depending on the characters (parameters) of the negotiators.

However, as there are infinite varieties of characters of negotiators, it has been difficult to properly set parameters, and it has been also difficult to achieve successful results from the role-playing-based education.

SUMMARY OF THE INVENTION

The present invention has been achieved in order to solve the above problems. It is an object of this invention to provide a role-playing simulation program, a role-playing simulation apparatus, and a role-playing simulation method capable of achieving successful results from role-playing-based education.

The role-playing simulation program according to one aspect of this invention makes a computer function as a parameter setting unit that sets a plurality of patterns of parameters indicating attributes of virtual players who participate in a virtual role-playing, a player agent unit that realizes the virtual players corresponding to the parameters, and a negotiation rule setting unit that sets a plurality of patterns of negotiation rules for a virtual lecture attendant who participates in the role-playing. The program also makes the computer function as a lecture attendant agent unit that realizes a virtual lecture attendant who carries out negotiations with the virtual players according to the negotiation rules, and a learning material preparing unit that allows the virtual players and the virtual lecture attendant to carry out negotiations corresponding to combinations of the patterns of the parameters and the negotiation rules, evaluates a negotiation result for each combination, and uses a parameter evaluated with at least a predetermined level as a learning material.

The role-playing simulation apparatus according to another aspect of this invention comprises a parameter setting unit that sets patterns of parameters indicating attributes of virtual players who participate in a virtual role-playing, a player agent unit that realizes the virtual players corresponding to the parameters, and a negotiation rule setting unit that sets patterns of negotiation rules for a virtual lecture attendant who participates in the role-playing. The apparatus also comprises a lecture attendant agent unit that realizes a virtual lecture attendant who carries out negotiations with the virtual players according to the negotiation rules, and a learning material preparing unit that allows the virtual players and the virtual lecture attendant to carry out negotiations corresponding to combinations of the patterns of the parameters and the negotiation rules, evaluate a negotiation result for each combination, and uses a parameter evaluated with at least a predetermined level as a learning material.

The role-playing simulation method according to still another aspect of this invention comprises steps of setting a plurality of patterns of parameters indicating attributes of virtual players who participate in a virtual role-playing, realizing the virtual players corresponding to the parameters, and setting a plurality of patterns of negotiation rules for a virtual lecture attendant who participates in the role-playing. The method also comprises steps of realizing a virtual lecture attendant who carries out negotiations with the virtual players according to the negotiation rules, allowing the virtual players and the virtual lecture attendant to carry out negotiations corresponding to combinations of the patterns of the parameters and the negotiation rules, evaluating a negotiation result for each combination, and using a parameter evaluated with at least a predetermined level as a learning material.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 5 shows a diagram of a table structure of a learning material definition information database 210 shown in FIG. 1, FIG. 6 shows a diagram of a table structure of a rule information database 220 shown in FIG. 1, FIG. 7 shows a diagram of a table structure of a simulation log information database 230 shown in FIG. 1, FIG. 8 shows a diagram of a table structure of a simulation result information database 240 shown in FIG. 1, FIG. 16 shows a flowchart of a learning material evaluation processing shown in FIG. 12, FIG. 17 shows a flowchart of a lecture attendance processing shown in FIG. 11, FIG. 18 shows a diagram of a screen shift in the lecture attendance processing shown in FIG. 17, FIG. 19 shows a diagram of a learning material selection screen 500 according to the embodiment, FIG. 21 shows a diagram of a lecture attendance result screen 520 according to the embodiment, and FIG. 22 shows a block diagram of the structure of a modification of the embodiment.

DETAILED DESCRIPTIONS

An embodiment of the role-playing simulation program, the role-playing simulation apparatus, and the role-playing simulation method according to the present invention is explained in detail below with reference to the attached drawings.

Figure 1:
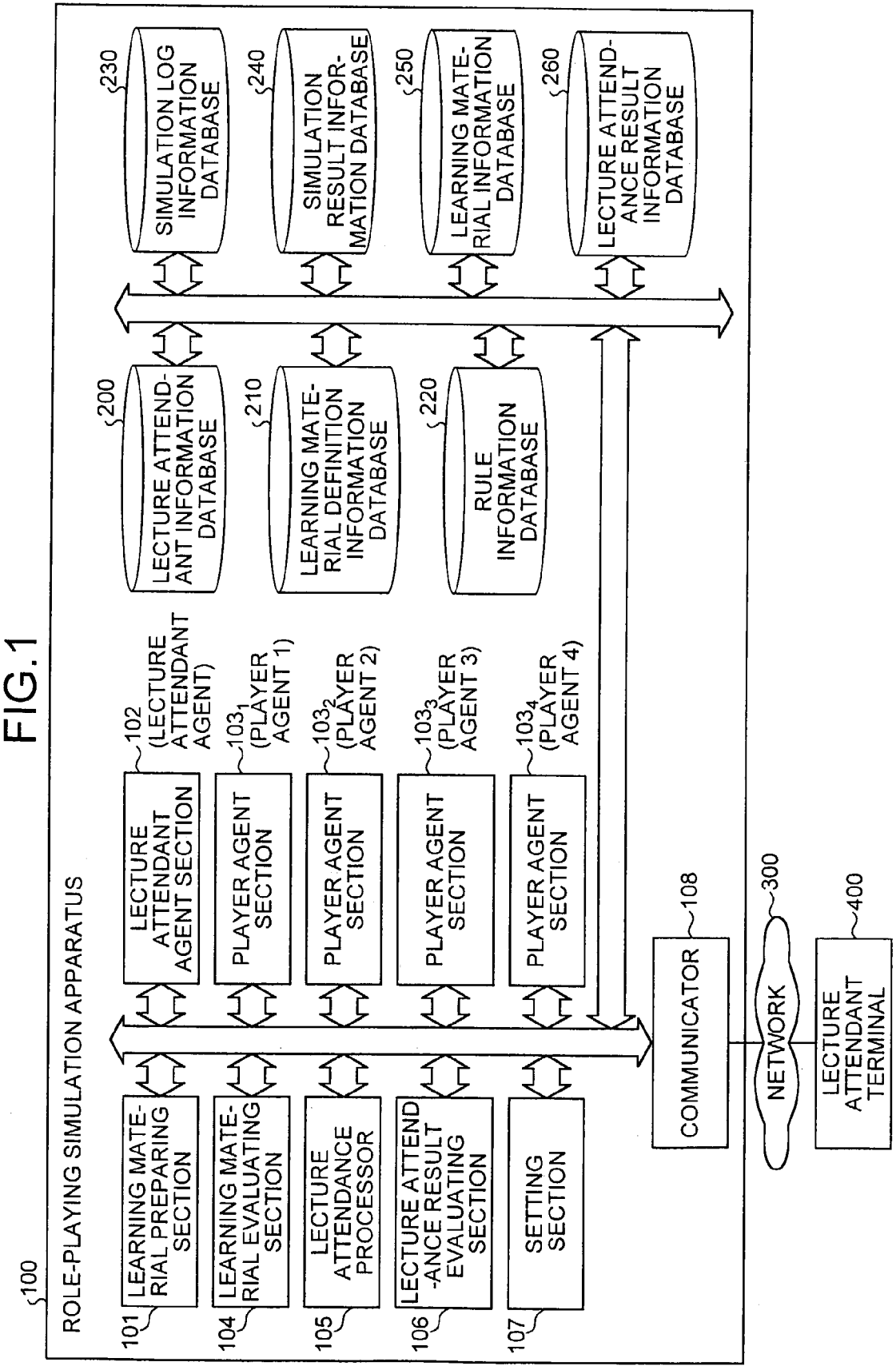
FIG. 1 shows a block diagram of a structure of one embodiment of the present invention.

FIG. 1 shows a block diagram of the structure of one embodiment of the present invention. In FIG. 1, a role-playing simulation apparatus 100 carries out a simulation of a role-playing between a virtual negotiator (player agent) and a lecture attendant.

Figure 2:
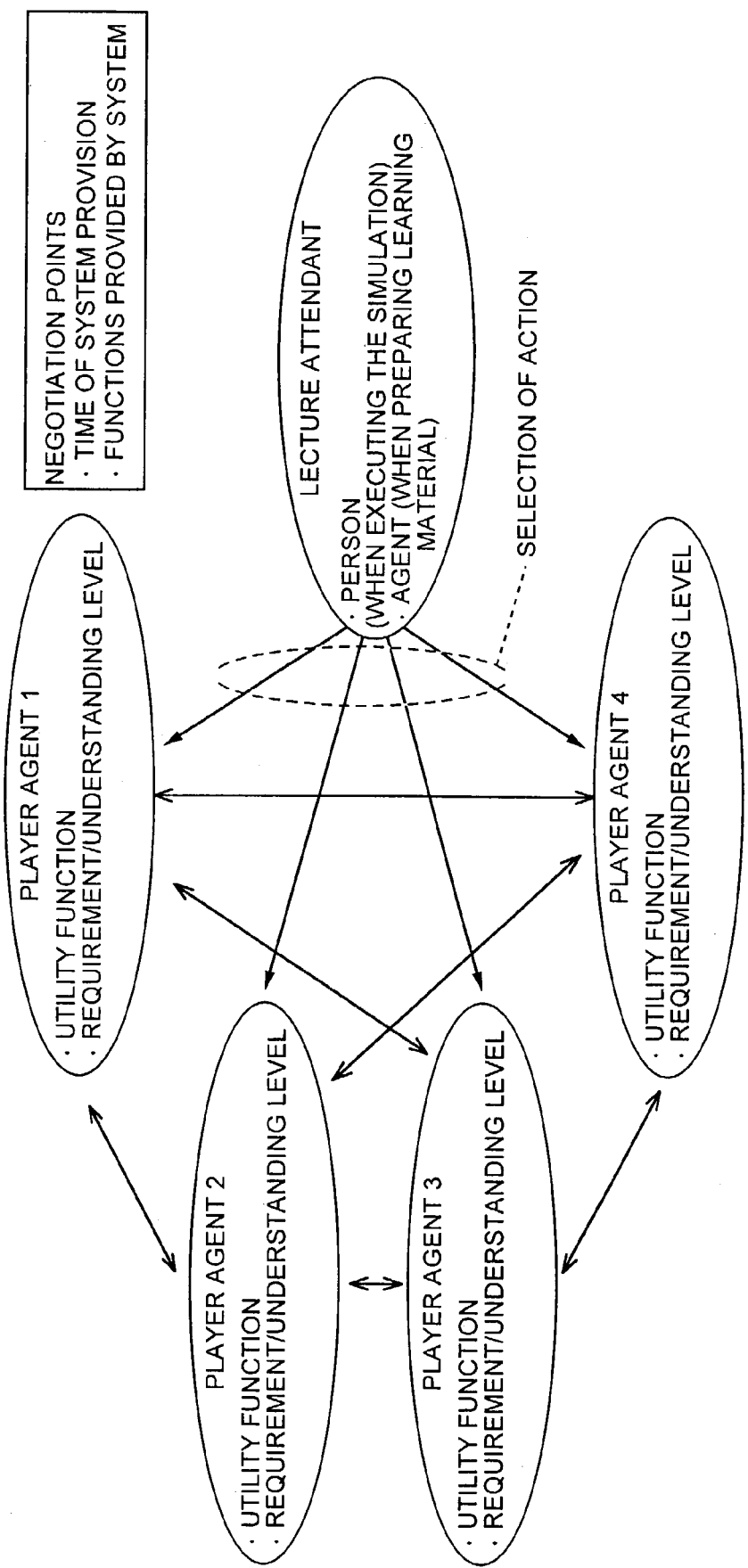
FIG. 2 shows a diagram of a pseudo negotiation scene in the embodiment.

The role-playing simulation apparatus 100 provides a pseudo negotiation scene as shown in FIG. 2. In FIG. 2, a lecture attendant negotiates with a player agent 1 to a player agent 4 about the time a system is provided ("time of system provision") and functions to be provided by the system ("provided functions").

The lecture attendant corresponds to a person (when executing a role-playing simulation) or a lecture attendant agent section 102 (when preparing a learning material). Each of the player agent 1 to the player agent 4 is a pseudo computer function to act as an agent of the actual negotiator, and is realized by each of player agent sections $103_1$ to $103_4$ respectively.

Persons corresponding to the player agent 1 to the player agent 4 are listed below.

player agent 1→customer information system manager player agent 2→customer information system staff in charge player agent 3→SE department manager of the own company player agent 4→sales department manager of the own company The player agent 1 (the customer information system manager) and the player agent 2 (the customer information system staff in charge) are assumed not to belong to the company for which the lecture attendant works, that is, these two agents are members of a target company to which the system is provided.

On the other hand, the player agent 3 (the SE department manager of the own company) and the player agent 4 (the sales department manager of the own company) are assumed to belong to the company for which the lecture attendant works, that is, these two agents correspond to superiors of the lecture attendant.

Respective characters of the player agent 1 to the player agent 4 are expressed based on parameters of requirement/understanding to be described later.

Figures 3, 4:
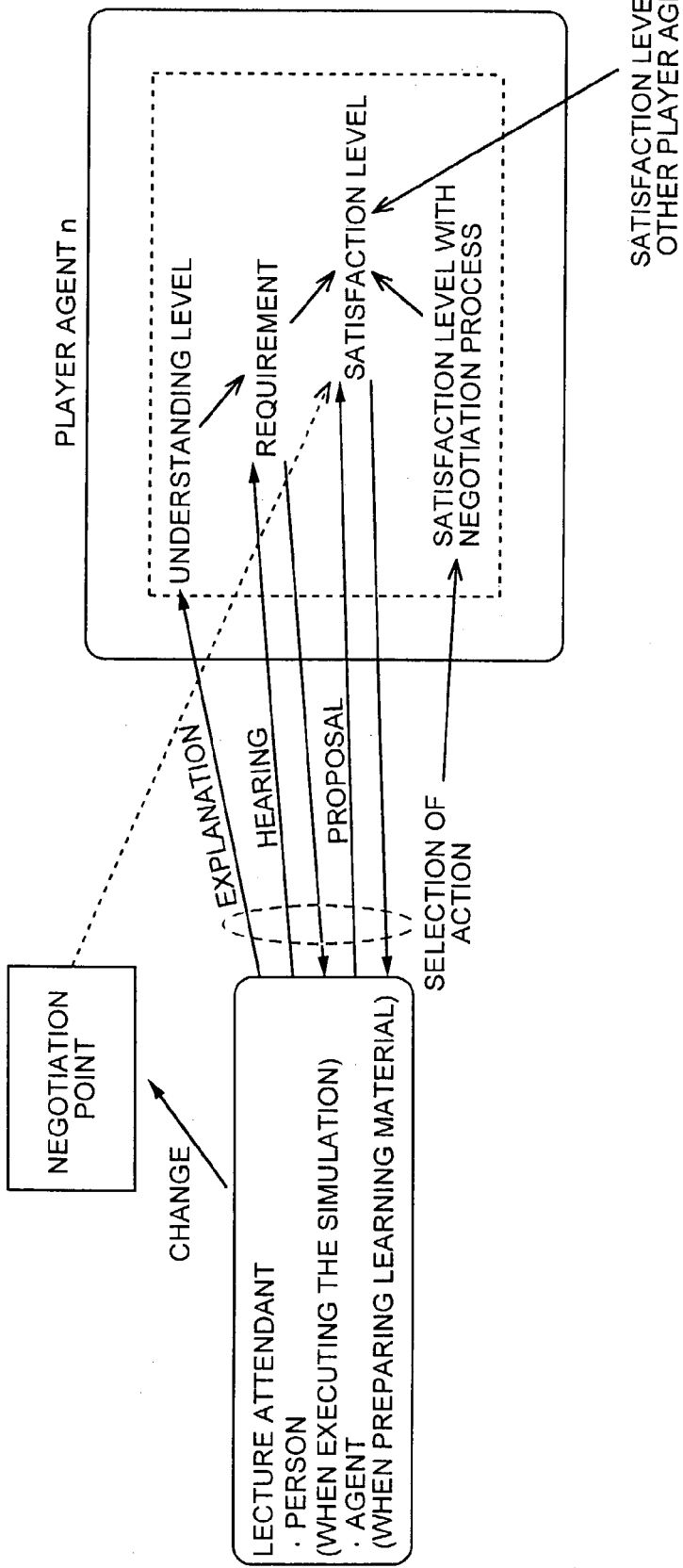
FIG. 3 shows a diagram of a negotiation process in the embodiment.
FIG. 4 shows a diagram of a table structure of a lecture attendant information database 200 shown in FIG. 1.

The lecture attendant proceeds with negotiations while taking actions to the player agent 1 to the player agent 4. As shown in FIG. 3, there are three kinds of actions including explanation, hearing, and proposal.

Characters of a player agent n (n=1 to 4) and a process of negotiation with the player agent n are expressed in parameters of understanding level, a value indicating requirements ("requirement value"), a satisfaction level, and a satisfaction level with negotiation process ("negotiation process satisfaction level"). Each of the understanding level, requirement value, satisfaction level, and negotiation process satisfaction level varies within a range from 0 to 1 inclusive.

The understanding level is a parameter indicating how a player agent n understands what the lecture attendant explains, that is, how the player agent is convinced by the explanation. The requirement value is a parameter indicating a requirement from the player agent n to the lecture attendant.

The satisfaction level is a parameter indicating a satisfaction level of the player agent n, and is given by the following equation (1).

$$\text{Satisfaction level=utility function+negotiation process satisfaction level} \quad (1)$$

The utility function in the equation (1) is given by the following equation (2).

$$\text{Utility function}=1-\Sigma\{\text{weight}\times|(\text{requirement value}-\text{proposal value})|\} \quad (2)$$

The utility function in the equation (2) is a function indicating utility of the player agent n from the contents (proposal value) proposed by the lecture attendant. The weight is a weight value set to each player agent n. The proposal value is a parameter indicating contents of proposal from the lecture attendant to the player agent n.

The negotiation process satisfaction level in the equation (1) is a parameter indicating a satisfaction level in the negotiation process. For example, when the lecture attendant has made a proposal that makes the player agent n produce a feeling of repulsion or when the lecture attendant has made error in the order of the negotiation process (such as direct negotiation by skipping the staff), the negotiation process satisfaction level is expressed as a minus value. On the other hand, when the lecture attendant has taken an appropriate negotiation process, the negotiation process satisfaction level is expressed as a plus value.

In FIG. 3, the explanation is an operation to enhance the level of understanding of the player agent 1 to the player agent 4. The hearing is an operation of the lecture attendant to inquire the player agent 1 to the player agent 4 to get a requirement value and a weight for each agent. The proposal is an operation of the lecture attendant to seek a settlement of the negotiation with the player agent 1 to the player agent 4.

According to the embodiment, the processing is broadly divided into processing for learning material preparation ("learning material preparation processing") and processing for lecture attendance ("lecture attendance processing"). In the learning material preparation processing, the lecture attendant shown in FIG. 2 acts as the lecture attendant agent section 102 and carries out pseudo negotiations with the player agent 1 (the player agent section $103_1$) to the player agent 4 (the player agent section $103_4$), to prepare a learning material. The learning material is parameters indicating characters or the like of the player agents.

On the other hand, in the lecture attendance processing, the lecture attendant shown in FIG. 2 is an actual person and carries out pseudo negotiations with the player agent 1 (the player agent section $103_1$) to the player agent 4 (the player agent section $103_4$) by using the prepared learning material.

Referring back to FIG. 1, a learning material preparing section 101 allows the lecture attendant agent section 102 and the player agent sections $103_1$ to $103_4$ to carry out pseudo negotiations, to prepare a learning material. The lecture attendant agent section 102 realizes a representative function of the lecture attendant shown in FIG. 2 when the learning material is prepared, based on a rule information database 220 to be described later.

The player agent sections $103_1$ to $103_4$ realize representative functions of the player agent 1 to the player agent 4 shown in FIG. 2 respectively, based on a database 210 of learning material definition information ("learning material definition information database 210") to be described later.

A learning material evaluating section 104 has a function of evaluating a learning material prepared by the learning material preparing section 101. A lecture attendance processor 105 has a function of allowing the lecture attendant (actual person) to attend the lecture and use the prepared learning material. During the lecture attendance, pseudo negotiations are carried out between the lecture attendant (actual person) and the player agent sections $103_1$ to $103_4$.

A lecture attendance result evaluating section 106 has a function of evaluating a result corresponding to the lecture attendance. A setting section 107 has a function of setting each piece of information in a lecture attendant information database 200 to be described later, the learning material definition information database 210, and the rule information database 220.

A communicator 108 controls communications with a lecture attendant terminal 400 connected to a network 300, according to a predetermined communication protocol. The lecture attendant terminal 400 is a computer terminal operated by the lecture attendant (actual person) during the lecture attendance, and comprises a main body of a computer, a display, a keyboard, a mouse, and communication equipment.

The lecture attendant information database 200 stores lecture attendant information. Specifically, the lecture attendant information database 200 has fields of "lecture attendant ID", "name", "job experience", etc. as shown in FIG. 4.

The "lecture attendant ID" is an identifier that identifies the lecture attendant. The "name" is information on the name of the lecture attendant. The "job experience" is information on job experience of the lecture attendant.

Referring back to FIG. 1, the learning material definition information database 210 stores learning material definition information on the characters of the player agents. Specifically, as shown in FIG. 5, the learning material definition information database 210 has fields of "learning material ID", "player agent 1 (the customer information system manager)", "player agent 2 (the customer information system staff in charge)", "player agent 3 (the SE department manager of the own company)", and "player agent 4 (the sales department manager of the own company)".

In the learning material definition information database 210, there are variations in the characters of the player agent 1 to the player agent 4 respectively, and combinations of the variations are set as pieces of learning material definition information.

The "learning material ID" is an identifier that identifies a learning material (learning material definition information). Each of the "player agent 1 (the customer information system manager)", "player agent 2 (the customer information system staff in charge)", "player agent 3 (the SE department manager of the own company)", and "player agent 4 (the sales department manager of the own company)" is set with "character" and "parameter".

The "character" has respective characters of the player agent 1 to the player agent 4 regarding the time of system provision and the provided functions described therein. For example, the player agent 1 (the customer information system manager) corresponding to a learning material ID=001 wants early and stable provision of the whole functions for system cutover.

The player agent 2 (the customer information system staff in charge) has characters similar to those of the player agent 1 (the customer information system manager), but is also anxious about a satisfaction level of the customer information system manager.

On the other hand, the player agent 3 (the SE department manager of the own company) wants to delay the provision of the system, and to limit a part of the functions. The player agent 4 (the sales department manager of the own company) has characters similar to those of the player agent 3 (the SE department manager of the own company). The player agent 4 also regards the satisfaction level of the customer information system manager most important, toward the commercial negotiation of a next-generation system, and is also anxious about the satisfaction level of the SE department manager of the own company.

The "parameter" is a numerical value indicating the "character". Specifically, the "parameter" has a weight and a requirement value set in each of "1: time of system provision" and "2: provided functions".

In the "1: time of system provision", the requirement value takes any one of values from 0 to 1. When the requirement value is 1, this means that no delay in the time of system provision is required. On the other hand, when the requirement value is 0, this means that delaying the time of system provision by half year is required.

In the "2: provided functions", the requirement value takes any one of the values from 0 to 1. When the requirement value is 1, this means that the provision of the whole functions is required. On the other hand, when the requirement value is 0, this means that limiting the provision of the functions by 30% (that is, the provision of 70% of the functions) is required. "Convergence decision value" is a value for deciding a convergence (success in negotiation) in the learning material preparation processing to be described later.

In the learning material definition information database 210, the "character" and "parameter" are changed for each player agent in the learning material definition information corresponding to learning material IDs=002 to 004.

Referring back to FIG. 1, the rule information database 220 stores rule information on negotiation rules (negotiator, kind of action, and negotiation process) used in the lecture attendant agent section 102 when the learning material is prepared. The rules are knowledge that the lecture attendant should master.

Specifically, as shown in FIG. 6, the rule information database 220 has fields of "rule", "rule definition", and "rule contents". The "rule" is an identifier that identifies a rule. The "rule definition" defines conditions and actions (explanation, hearing, and proposal) as rules.

For example, when a condition that the satisfaction level of the player agent 2 is less than 0.2 is satisfied, the lecture attendant agent section 102 takes action to explain "about something" to the player agent 1.

When a condition that the satisfaction level of the player agent 2 is less than 0.3 is satisfied, the lecture attendant agent section 102 takes action to inquire the player agent 2 about "something" and get some required information therefrom.

The "rule definition" is described in an artificial intelligence (AI) language. The "rule contents" shows the contents of the "rule definition".

Referring back to FIG. 1, a database 230 of simulation logs information ("simulation log information database 230") stores simulation log information in the simulation processing for preparing a learning material.

Specifically, as shown in FIG. 7, the simulation log information database 230 has fields of "number of actions taken", "action", "application rule", "proposal value", "player agent 1", "player agent 2", etc.

The "number of actions taken" shows a number of times of actions taken by the lecture attendant agent section 102. The "action" shows actions (explanation, hearing, and proposal) taken by the lecture attendant agent section 102. In FIG. 7, reference numeral A1 denotes the player agent 1.

The "application rule" shows a rule applied to prepare a learning material. The "proposal value" shows a value (time the system is provided, and functions to be provided by the system) when the lecture attendant agent section 102 has made a proposal as an action. In the "player agent 1", there are stored parameters of the understanding level, requirement value (time the system is provided, and functions to be provided by the system), negotiation process satisfaction level, and the satisfaction level.

Similarly, in each of the "player agent 2" to "player agent 4" partly not shown, there are stored parameters of the understanding level, requirement value (time the system is provided, and functions to be provided by the system), negotiation process satisfaction level, and the satisfaction level.

Referring back to FIG. 1, a database 240 of simulation result information ("simulation result information database 240") stores simulation result information at the time of preparing a learning material. Specifically, as shown in FIG. 8, the simulation result information database 240 has fields of "rule combination", "learning material 1 (the learning material ID=001)", "learning material 2 (the learning material ID=002)", "learning material 3 (the learning material ID=003)", and "learning material 4 (the learning material ID=004)".

The "rule combination" shows combinations (a single or a composite) of rules (R1, R2, and R3: refer to FIG. 6) applied to the preparation of a learning material. The "learning material 1" corresponds to the learning material ID=001 (refer to FIG. 5). In this "learning material 1", there are stored values of "average number of times (minimum number of times) until convergence", "number of times of non-convergence", and "number of times of convergence".

The "average number of times (minimum number of times) until convergence" shows an average number of times of actions taken from a start to a convergence when satisfaction levels of all player agents (the lecture attendant agent sections $103_1$ to $103_4$) become not less than a threshold value (convergence, successful negotiation) with respect to a proposal made by the lecture attendant agent section 102 within a predetermined number of times of actions (for example, 400 times), in the simulation processing at the time of preparing a learning material.

The minimum number is a smallest number of times of actions taken during the execution of simulation processing a plurality of times (for example, 150 times). In other words, when the number of times of actions taken from the start to the end in the negotiation is smaller, the negotiation is concluded more efficiently.

The "number of times of non-convergence" is a number of times of actions taken when the negotiation has not been converged even after exceeding a predetermined number (for example, 400 times) during the execution of simulation processing a plurality of times (for example, 150 times).

The "number of times of convergence" is a number of times of actions taken when the negotiation is converged within a predetermined number (for example, 400 times) during the execution of simulation processing a plurality of times (for example, 150 times).

In each of the "learning material 2 (the learning material ID=002)", "learning material 3 (the learning material ID=003)", and "learning material 4 (the learning material ID=004)", there are stored values of "average number of times (a minimum number) until convergence", "number of times of non-convergence", and "number of times of convergence", in a similar manner to that of the "learning material 1 (the learning material ID=001)".

Referring back to FIG. 1, a learning material information database 250 stores learning material information on any learning material and rule that are highly evaluated and are suitable for actual lecture attendance, among combinations of prepared learning materials and rules. Specifically, as shown in FIG. 9, the learning material information database 250 has fields of "learning material ID", "class", "best practice (a minimum number)", and "rule".

The "learning material ID" corresponds to the "learning material ID" shown in FIG. 5. For the "class", there are set an elementary class, an intermediate class, and an advanced class, according to a difficulty level of a learning material. The "best practice (minimum number of times)" is a minimum number of times from a start to a convergence (refer to FIG. 8) in the simulation processing at the time of preparing a learning material by using the learning material and the rule. The "rule" indicates the rules applied to the learning material.

Referring back to FIG. 1, a database 260 of lecture attendance result information ("lecture attendance result information database 260") stores lecture attendance result information when the lecture attendant (person) attends a lecture in which a learning material corresponding to the learning material information database 250 is used.

Figures 9, 10, 11:
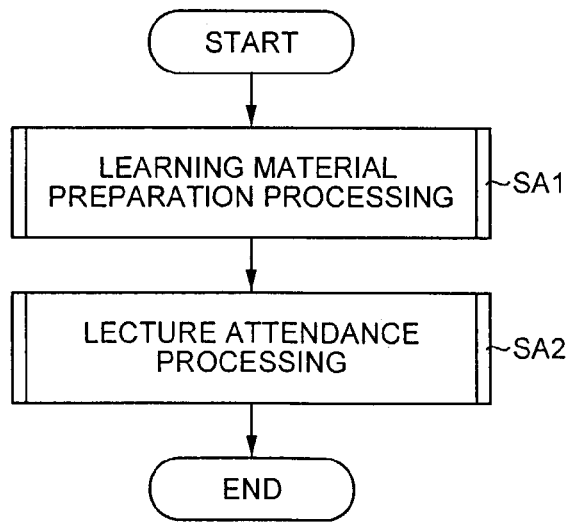
FIG. 9 shows a diagram of a table structure of a learning material information database 250 shown in FIG. 1.
FIG. 10 shows a diagram of a table structure of a lecture attendance result information database 260 shown in FIG. 1.
FIG. 11 shows a flowchart of the operation of the embodiment.
Figure 12:
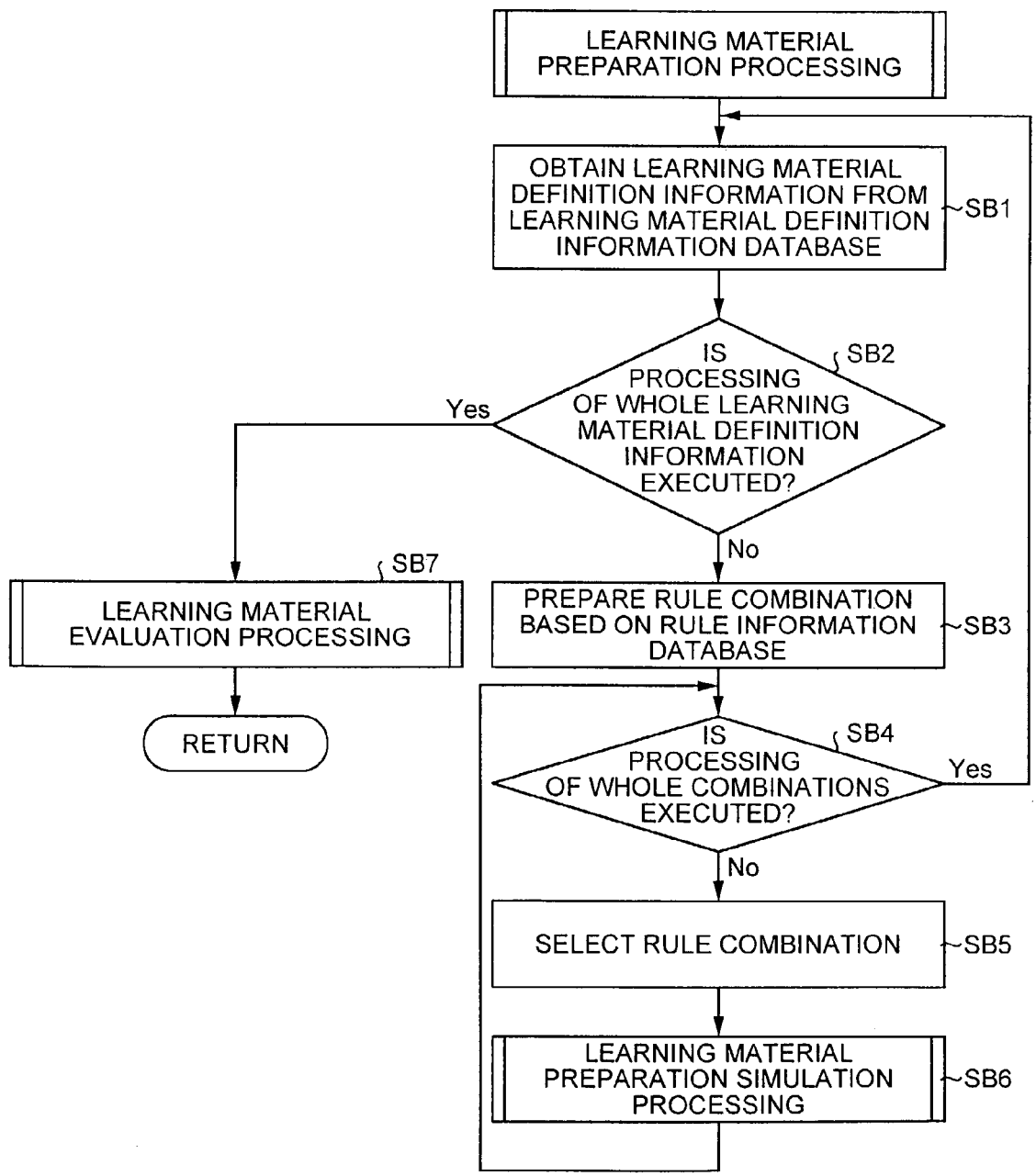
FIG. 12 shows a flowchart of a learning material preparation processing shown in FIG. 11.

Specifically, as shown in FIG. 10, the lecture attendance result information database 260 has fields of "lecture attendant ID", "lecture attendance date", "learnt learning material ID", and "point". The "lecture attendant ID" is an identifier that identifies a lecture attendant who attends a lecture, and this corresponds to the lecture attendant ID shown in FIG. 4.

The "lecture attendance date" shows a date when the lecture attendant attends a lecture. The "learnt learning material ID" is an identifier that identifies a learning material used in the lecture that the attendant attends, and this corresponds to the learning material ID shown in FIG. 9. The "point" shows a number of times of actions taken from a start to a convergence in the lecture attendance simulation processing.

The operation of the embodiment is explained in detail below with reference to flowcharts shown in FIG. 11 to FIG. 17 and diagrams shown in FIG. 18 to FIG. 21. At step SA1 in FIG. 11, a learning material preparation processing for preparing a learning material to be provided to a lecture attendant is executed. Specifically, at step SB1 in FIG. 12, the learning material preparing section 101 obtains learning material definition information corresponding to the learning material ID=001 from the learning material definition information database 210 shown in FIG. 5.

At step SB2, the learning material preparing section 101 decides whether the processing of the whole learning material definition information stored in the learning material definition information database 210 is executed. In this example, the learning material preparing section 101 sets "No" as a result of the decision made at step SB2.

At step SB3, the learning material preparing section 101 prepares combinations of rules (including a single rule) to be applied to the preparation of a learning material, based on the rule information database 220 shown in FIG. 6. Combinations of rules from (1) to (7) shown below are prepared based on three rules of rule R1, rule R2, and rule R3.

Combinations of Rules:
(1) R1
(2) R2
(3) R1+R2
(4) R3
(5) R1+R3
(6) R2+R3
(7) R1+R2+R3

The above-described combinations of rules correspond to "rule combination" of the simulation result information database 240 shown in FIG. 8.

At step SB4, the learning material preparing section 101 decides whether the processing of the whole rule combinations ((1) to (7)) prepared at step SB3 is executed. In this example, the section 101 sets "No" as a result of the decision made at step SB4.

At step SB5, the learning material preparing section 101 selects (1) R1 as one rule combination from among the rule combinations ((1) to (7)) prepared at step SB3.

At step SB6, the learning material preparing section 101 executes a learning material preparation simulation processing. In this learning material preparation simulation processing, a simulation according to a role-playing format is carried out by using the learning material definition information obtained at step SB1 and the rule combination (rule information) selected at step SB5.

Figure 13:
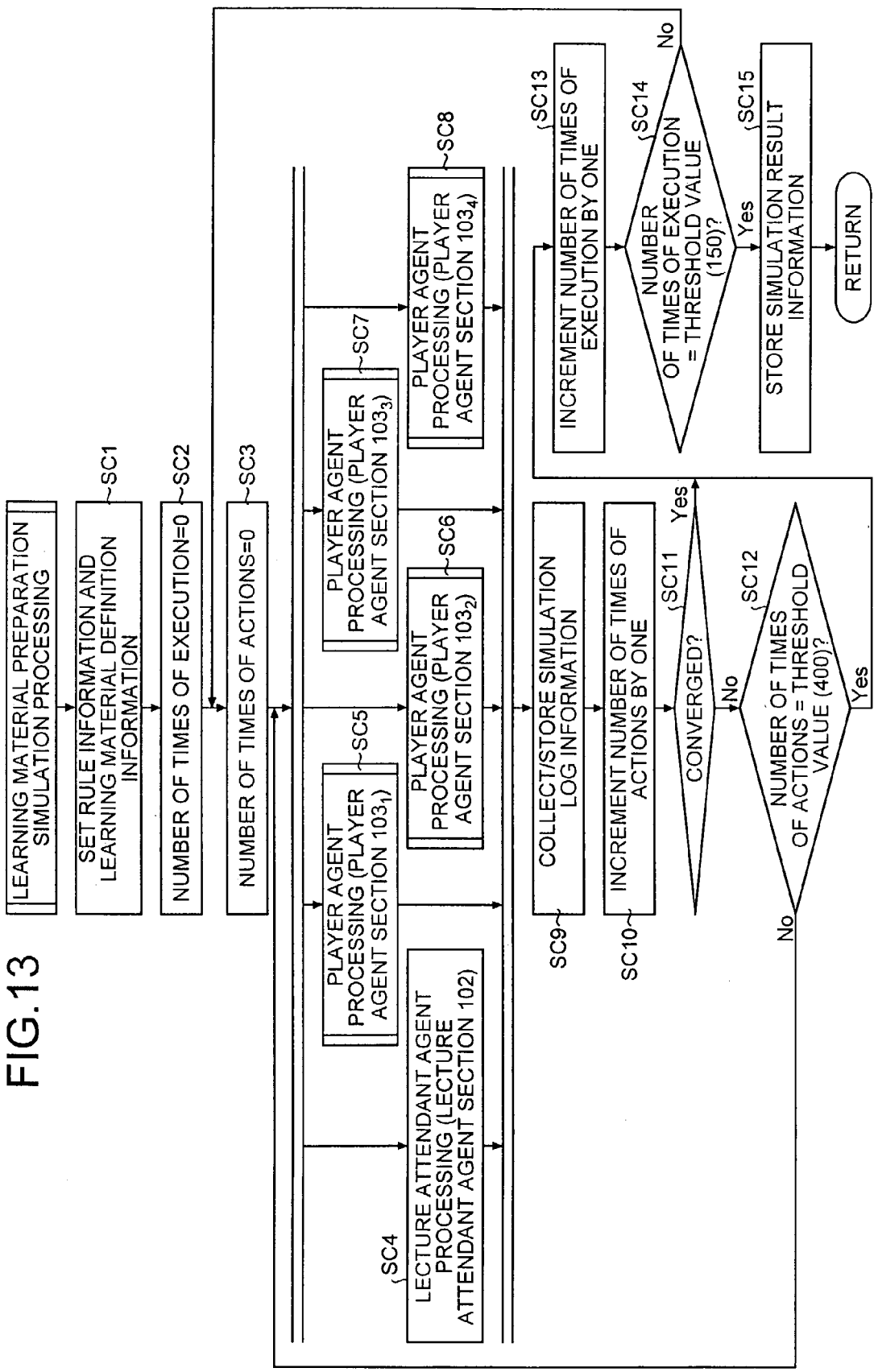
FIG. 13 shows a flowchart of a learning material preparation simulation shown in FIG. 12.

Specifically, at step SC1 shown in FIG. 13, the learning material preparing section 101 obtains rule information corresponding to the rule combination ((1) R1) selected at step SB5 (refer to FIG. 12) from the rule information database 220, and sets this rule information to the lecture attendant agent section 102.

The learning material preparing section 101 sets the learning material definition information obtained at step SB1 (refer to FIG. 12) in the player agent sections $103_1$ to $103_4$ respectively. In this example, among the learning material definition information corresponding to the learning material ID=001, the learning material preparing section 101 sets the learning material definition information (utility function, weight, and convergence decision value) corresponding to the "player agent 1" in the player agent section $103_1$ (the player agent 1: customer information system manager).

Among the learning material definition information, the learning material preparing section 101 sets the learning material definition information corresponding to the "player agent 2" in the player agent section $103_2$ (the player agent 2: customer information system staff in charge).

Among the learning material definition information, the learning material preparing section 101 sets the learning material definition information corresponding to the "player agent 3" in the player agent section $103_3$ (the player agent 3: SE department manager of the own company).

Among the learning material definition information, the learning material preparing section 101 sets the learning material definition information corresponding to the "player agent 4" in the player agent section $103_4$ (the player agent 4: sales department manager of the own company).

At step SC2, the learning material preparing section 101 sets 0 to the number of times of executing simulation, as an initial value. At step SC3, the section 101 sets 0 to the number of times of carrying out actions per one simulation, as an initial value.

At step SC4 to step SC8, the lecture attendant agent section 102 and the player agent sections $103_1$ to $103_4$ carry out simulation in parallel according to a role-playing.

In other words, at step SC4, the lecture attendant agent section 102 executes a lecture attendant agent processing according to the rule information (the rule R1) set at step SC1.

Figure 14:
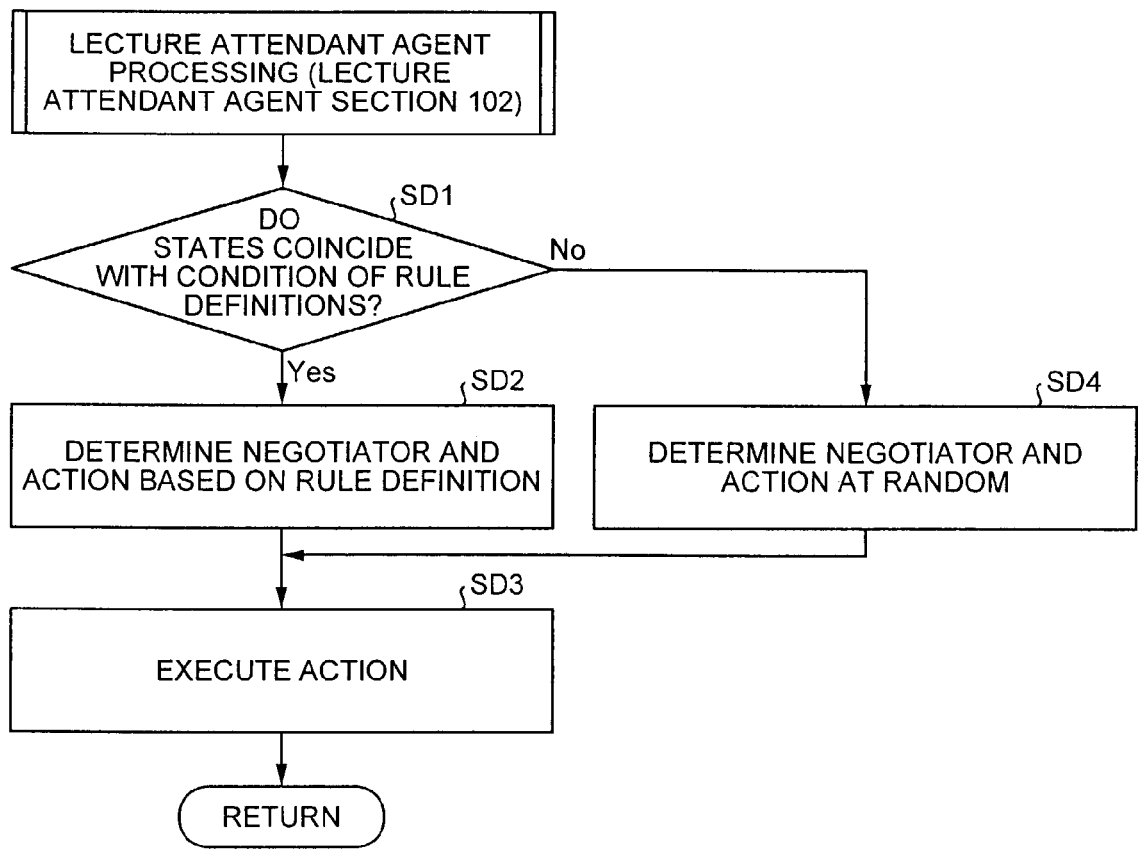
FIG. 14 shows a flowchart of a lecture attendant agent processing shown in FIG. 13.

Specifically, at step SD1 shown in FIG. 14, the lecture attendant agent section 102 decides whether the states (parameters of satisfaction level, etc.) of the player agent sections $103_1$ to $103_4$ as the negotiators coincide with the conditions of the rule definition of the rule R1 (satisfaction level of the player agent 1, satisfaction level of the player agent 2, etc.) as shown in FIG. 6.

When a result of the decision made at step SD1 is "Yes", at step SD2, the lecture attendant agent section 102 determines a negotiator (any one of the player agent sections $103_1$ to $103_4$) and an action (any one of explanation, hearing, and proposal) based on the rule definition. When "proposal" is determined as the action, the lecture attendant agent section 102 notifies the negotiator of a proposal value.

At step SD3, the lecture attendant agent section 102 executes the action based on the rule definition to the negotiator determined at step SD2.

On the other hand, when a result of the decision made at step SD1 is "No", at step SD4, the lecture attendant agent section 102 determines randomly a negotiator and an action. This determination is executed to reflect a factor such as an unexpected situation or a negotiation error (mentioning an unprepared word to a negotiator the attendant does not intend to talk to) in the actual negotiation scene, to a simulation result. Therefore, depending on the processing at step SD4, there may be a large change in the progress of the negotiation.

At step SD3, the lecture attendant agent section 102 executes the action to the negotiator determined at step SD4.

At step SC5 to step SC8 shown in FIG. 13, each of the player agent sections $103_1$ to $103_4$ executes the player agent processing to react to the action from the lecture attendant agent section 102, based on the learning material definition information set at step SC1.

Figure 15:
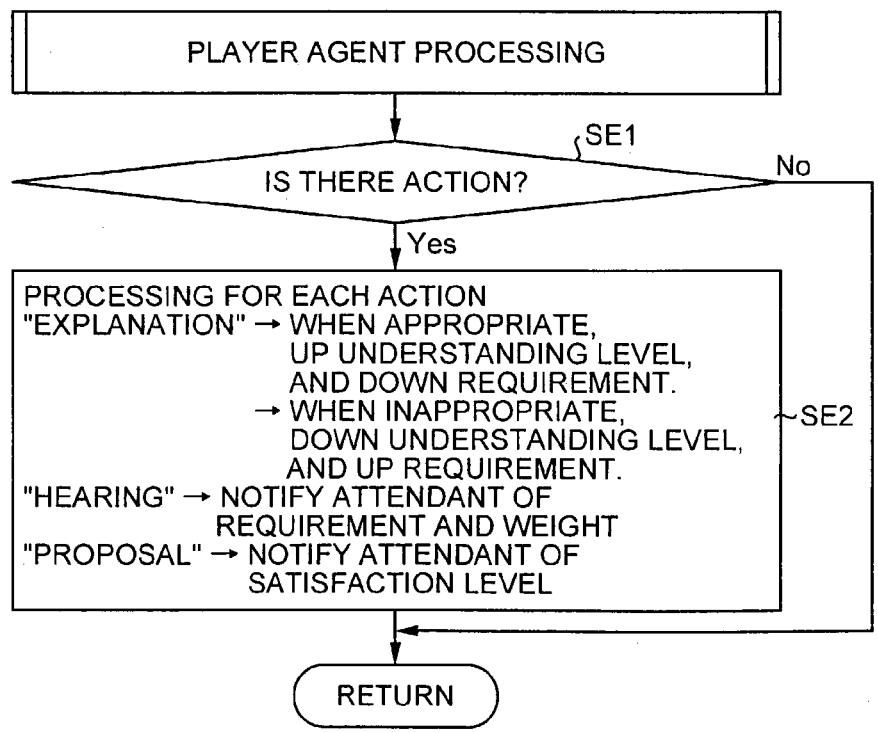
FIG. 15 shows a flowchart of a player agent processing shown in FIG. 13.

Specifically, at step SE1 shown in FIG. 15, each of the player agent sections $103_1$ to $103_4$ decides whether there is an action (explanation, hearing, and proposal: corresponding to step SD3 shown in FIG. 14) from the lecture attendant agent section 102. When a result of the decision made at step SE1 is "No", the player agent processing is ended.

On the other hand, when a result of the decision made at step SE1 is "Yes", at step SE2, each of the player agent sections $103_1$ to $103_4$ executes the processing of each action.

When the action is "explanation" and the explanation contents are appropriate, the understanding level is increased by a predetermined value, and the requirement value is lowered by a predetermined value, which becomes advantageous for the lecture attendant agent section 102. On the other hand, when the explanation contents are inappropriate, the understanding level is lowered by a predetermined value, and the requirement value increases by a predetermined value, which is disadvantageous for the lecture attendant agent section 102.

When the action is "hearing", a requirement value and a weight are notified to the lecture attendant agent section 102. When the action is "proposal", a satisfaction level is calculated based on a proposal value from the lecture attendant agent section 102, and this satisfaction level is notified to the lecture attendant agent section 102.

Referring back to FIG. 13, at step SC9, the learning material preparing section 101 collects simulation log information (refer to FIG. 7) from the lecture attendant agent section 102 and the player agent sections $103_1$ to $103_4$.

Specifically, the learning material preparing section 101 collects information on action, application rule, and proposal value (the time and function) from the lecture attendant agent section 102 as simulation log information.

The learning material preparing section 101 collects information on an understanding level, a requirement value (the time and function), a negotiation process satisfaction level, and a satisfaction level from each of the player agent sections $103_1$ to $103_4$ as simulation log information.

The learning material preparing section 101 stores the collected simulation log information into the record of the number of times of taking actions (one, in this example) in the simulation logs information database 230 shown in FIG. 7.

At step SC10, the learning material preparing section 101 increments the number of times of taking actions by one. At step SC11, the section 101 decides whether the negotiation is converged, that is, whether all the satisfaction values of each player agent included in the simulation log information stored at step SC9 are equal to or higher than the convergence decision value (refer to FIG. 5). When a result of the decision made at step SC11 is "No", the section 101 makes decision at step SC12.

At step SC12, the learning material preparing section 101 decides whether the number of times of actions taken is equal to a threshold value (for example, 400). In this example, a result of the decision made at step SC12 is set "No". Thereafter, the processing at step SC4 to step SC12 is repeated until when a result of the decision made at step SC11 or step SC12 becomes "Yes".

When the result of the decision made at step SC12 becomes "Yes", the execution of the first simulation is ended. At step SC13, the learning material preparing section 101 increments the number of times of execution by one. When a result of the decision made at step SC11 is "Yes", the section 101 executes the processing at step SC13.

At step SC14, the learning material preparing section 101 decides whether the number of times of execution is equal to a threshold value (for example, 150). In this example, a result of the decision made at step SC14 is set "No". Thereafter, second to 150-th simulations (step SC3 to step SC 14) are sequentially executed.

When a result of the decision made at step SC14 is "Yes", the 150 times of simulations are ended. At step SC15, the learning material preparing section 101 stores simulation result information into the simulation result information database 240 shown in FIG. 8. In this example, the simulation result information is stored into the record (the learning material 1 to the learning material 4) corresponding to the "rule combination"=R1.

Referring back to FIG. 12, at step SB4, the learning material preparing section 101 decides whether the processing of all the rule combinations ((1) to (7)) prepared at step SB3 is executed. In this example, a result of the decision made at step SB4 is set "No".

At step SB5, the learning material preparing section 101 selects (2) R2 as the next rule combination from among the rule combinations ((1) to (7)) prepared at step SB3.

At step SB6, the learning material preparing section 101 executes the simulation processing for learning material preparation ("learning material preparation simulation processing") by using the learning material definition information obtained at step SB1 and the rule information corresponding to the rule combination R2 in (2), in a similar manner to that of the operation.

Thereafter, the learning material preparing section 101 repeatedly executes the learning material preparation simulation processing relating to the remaining rule combinations ((3) to (7)) until a result of the decision made at step SB4 becomes "Yes".

When the result of the decision made at step SB4 becomes "Yes", at step SB1, the learning material preparing section 101 obtains learning material definition information corresponding to the next learning material ID=002 from the learning material definition information database 210 shown in FIG. 5.

Thereafter, the learning material preparing section 101 repeatedly executes the learning material preparation simulation processing based on the learning material definition information corresponding to the remaining learning material IDs=002 to 004 and the rule information corresponding to the rule combinations ((1) to (7)), until a result of the decision made at step SB2 becomes "Yes".

When the result of the decision made at step SB2 becomes "Yes", the learning material evaluation processing is executed at step SB7. In this learning material evaluation processing, learning materials and rules are correlated to each other from the viewpoint of evaluation on which rule should be applied to each learning material to efficiently carry out negotiations.

Specifically, at step SF1 shown in FIG. 16, the learning material evaluating section 104 obtains simulation result information (rule combination, number of times of non-convergence, number of times of convergence) corresponding to one learning material ID (the learning material 1 (the learning material ID=001)) from the simulation result information database 240 shown in FIG. 8.

At step SF2, the learning material evaluating section 104 decides whether there is a rule that the number of times of non-convergence is 0 in the simulation result information obtained at step SF1, that is, whether there is a rule that the negotiation can be converged by 100%.

There is 0 in "number of times of non-convergence" corresponding to "R1+R2+R3" of the "learning material 1" shown in FIG. 8. Therefore, the learning material evaluating section 104 sets "Yes" as a result of the decision made at step SF2. At step SF6, the learning material evaluating section 104 relates the rule and the best practice to the learning material ID=001 corresponding to the "learning material 1".

In this example, the rule is "R1+R2+R3", and the best practice is the minimum number of times (=10) corresponding to the "learning material 1" and "R1+R2+R3" as shown in FIG. 8.

At step SF8, the learning material evaluating section 104 decides whether the processing of all the learning material IDs has been ended. In this example, a result of the decision made at step SF8 is set "No". At step SF1, the learning material evaluating section 104 obtains simulation result information (rule combination, number of times of non-convergence, number of times of convergence) corresponding to the next learning material (the learning material 2 (the learning material ID=002)) from the simulation result information database 240 shown in FIG. 8.

At step SF2, the learning material evaluating section 104 decides whether there is a rule that the number of times of non-convergence is 0 in the simulation result information obtained at step SF1. In this example, a result of the decision made at step SF2 is set "No".

At step SF3, the learning material evaluating section 104 decides whether there is a single rule that the number of times of convergence is equal to or higher than a threshold value (for example, 140) in the simulation result information obtained at step SF1. The single rule is R1, R2, or R3.

In the example of the "learning material 2" shown in FIG. 8, the number of times of convergence is 148 (≧threshold value 140) when the single rule is R3. Therefore, the learning material evaluating section 104 sets "Yes" as a result of the decision made at step SF3.

At step SF5, the learning material evaluating section 104 selects a rule that the number of times of convergence is a maximum among the rules that satisfy the condition of step SF3. Only R3 is the rule that satisfies the condition of step SF3. Therefore, the section 104 selects R3.

At step SF6, the learning material evaluating section 104 relates the rule and the best practice to the learning material ID=002 corresponding to the "learning material 2".

In this example, the rule is "R3", and the best practice is the minimum number of times (=12) corresponding to the "learning material 2" and "R3" shown in FIG. 8.

At step SF8, the learning material evaluating section 104 decides whether the processing of all the learning material IDs has been ended. In this example, a result of the decision made at step SF8 is set "No". At step SF1, the learning material evaluating section 104 obtains simulation result information (rule combination, number of times of non-convergence, number of times of convergence) corresponding to the next learning material (the learning material 3 (the learning material ID=003)) from the simulation result information database 240 shown in FIG. 8.

At step SF2, the learning material evaluating section 104 decides whether there is a rule that the number of times of non-convergence is 0 in the simulation result information obtained at step SF1. In this example, a result of the decision made at step SF2 is set "No".

At step SF3, the learning material evaluating section 104 decides whether there is a single rule that the number of times of convergence is equal to or higher than a threshold value (for example, 140) in the simulation result information obtained at step SF1.

In the example of the "learning material 3" shown in FIG. 8, the number of times of convergence is 148 (≧threshold value 140) when the single rule is R2. Therefore, the learning material evaluating section 104 sets "Yes" as a result of the decision made at step SF3.

At step SF5, the learning material evaluating section 104 selects a rule that the number of times of convergence is a maximum among the rules that satisfy the condition of step SF3. Only R2 is the rule that satisfies the condition of step SF3, and therefore the learning material evaluating section 104 selects R2.

At step SF6, the learning material evaluating section 104 relates the rule and the best practice to the learning material ID=003 corresponding to the "learning material 3".

In this example, the rule is "R2", and the best practice is the minimum number of times (=15) corresponding to the "learning material 3" and "R2" shown in FIG. 8.

At step SF8, the learning material evaluating section 104 decides whether the processing of all the learning material IDs has been ended. In this example, a result of the decision made at step SF8 is set "No". At step SF1, the learning material evaluating section 104 obtains simulation result information (rule combination, number of times of non-convergence, number of times of convergence) corresponding to the next learning material (the learning material 4 (the learning material ID=004)) from the simulation result information database 240 shown in FIG. 8.

At step SF2, the learning material evaluating section 104 decides whether there is a rule that the number of times of non-convergence is 0 in the simulation result information obtained at step SF1. In this example, a result of the decision made at step SF2 is set "No".

At step SF3, the learning material evaluating section 104 decides whether there is a single rule that the number of times of convergence is equal to or higher than a threshold value (for example, 140) in the simulation result information obtained at step SF1. In this example, a result of the decision made at step SF3 is set "No".

At step SF4, the learning material evaluating section 104 decides whether there is a composite rule that the number of times of convergence is equal to or higher than a threshold value (for example, 140) in the simulation result information obtained at step SF1. The composite rule is a combination of a plurality of single rules (R1+R2, etc.).

In the example of the "learning material 4" shown in FIG. 8, the numbers of times of convergence are 143 and 149 (≧threshold value 140) when the composite rules are "R1+R3" and "R2+R3". Therefore, the learning material evaluating section 104 sets "Yes" as a result of the decision made at step SF4.

At step SF5, the learning material evaluating section 104 selects "R2+R3" as a rule that the number of times of convergence is the maximum among the rules that satisfy the condition of step SF4.

At step SF6, the learning material evaluating section 104 relates the rule and the best practice to the learning material ID=004 corresponding to the "learning material 4".

In this example, the rule is "R2+R3", and the best practice is the minimum number of times (=14) corresponding to the "learning material 4" and "R2+R3" shown in FIG. 8. It is noted that when a result of the decision made at step SF4 is "No", at step SF7, the learning material evaluating section 104 sets error as a result of evaluating the learning material based on decision that there is no rule for establishing the negotiation.

When a result of the decision made at step SF8 becomes "Yes", at step SF9, the learning material evaluating section 104 stores the learning material information based on the result of the processing at step SF6 into the learning material information database 250 shown in FIG. 9. Accordingly, the learning material preparation processing (step SA1: refer to FIG. 11) is ended.

The "class" shown in FIG. 9 has three classes of an elementary class, an intermediate class, and an advanced class, for example, according to a difficulty level of a rule (set in advance). These classes are used as an index for the lecture attendant to select learning materials.

For example, the rule of R1+R2+R3 has the highest difficulty level in handling, and is categorized as the most advanced class. R2 and R3 are categorized as the elementary class. R2+R3 is categorized as the intermediate class.

Referring back to FIG. 11, at step SA2, processing for lecture attendance is executed. Specifically, the processing is such that the lecture attendant carries out a simulation according to an actual role-playing by using the learning material prepared in the learning material preparation processing.

In the lecture attendance processing, as shown in FIG. 18, a learning material is selected on a learning material selection screen 500 (refer to FIG. 19), and simulation is carried out based on the learning material on a lecture attendance screen 510. A result of lecture attendance is evaluated on a lecture attendance result screen 520.

Specifically, at step SG1 shown in FIG. 17, the lecture attendant enters the lecture attendant ID (for example, 7909091) through a keyboard (not shown) at the lecture attendant terminal 400, to attend a lecture. The lecture attendant ID (7909091) is then notified to the role-playing simulation apparatus 100 (refer to FIG. 1) via the network 300.

At step SG2, the lecture attendance processor 105 determines a learning material to be recommended to the lecture attendant from among learning materials (the learning material IDs=001 to 004: refer to FIG. 9) prepared in the learning material preparation processing, based on the lecture attendant information corresponding to the lecture attendant ID.

Specifically, the lecture attendance processor 105 obtains lecture attendant information from the lecture attendant information database 200 (refer to FIG. 4), using the lecture attendant ID (=7909091) as a key. Next, the lecture attendance processor 105 searches the lecture attendance result information database 260 shown in FIG. 10 for lecture attendance result information, using the lecture attendant ID (=7909091) as a key.

When lecture attendance result information is retrieved, that is, when the lecture attendant has already attended a lecture, the lecture attendance processor 105 extracts a learning material ID (002, in this example) from the lecture attendance result information. In other words, the lecture attendant has already attended the lecture of the learning material 2 (elementary class) corresponding to the learning material ID=002.

As explained above, when the lecture attendant has already attended the lecture, the lecture attendance processor 105 refers to the learning material information database 250 (refer to FIG. 9), and determines the learning material (the learning material ID=004) of the class (intermediate class) one level above the class of the learning material 2 (elementary class) that the lecture attendant has already learnt.

When lecture attendance result information has not been retrieved, that is, when the lecture attendant has not attended any lecture, the lecture attendance processor 105 obtains information on job experience (in this example, three years as SE: refer to FIG. 4) from the lecture attendant information. Next, the lecture attendance processor 105 refers to the lecture attendant information database 200 (refer to FIG. 4), and obtains other lecture attendant ID corresponding to other lecture attendant who has the same job experience as that of the lecture attendant.

The lecture attendance processor 105 totals learning material IDs learnt by the other attendant and points, using the obtained other lecture attendant ID as a key. The lecture attendance processor 105 checks a learning material ID corresponding to a learning material in the lecture that a largest number of attendants has attended even if the point is not less than a threshold value. In other words, the lecture attendant may obtain a high point when attending the lecture of this learning material. The lecture attendance processor 105 determines this learning material as the learning material to be recommended.

At step SG3, the lecture attendance processor 105 displays the learning material selection screen 500 shown in FIG. 19 on a display (not shown), based on the information for the learning material information database 250 (refer to FIG. 9) and the recommendable learning material (in this case, the learning material 4 corresponding to the learning material ID=004) determined at step SG2.

On the learning material selection screen 500, there is displayed information for four learning materials including the learning material 1 (advanced class), the learning material 4 (intermediate class), the learning material 2 (elementary class), and the learning material 3 (elementary class) corresponding to the learning material IDs=001, 004, 002, and 003 respectively shown in FIG. 9, and there is also displayed the recommendable learning material (the learning material 4).

At step SG4, the lecture attendant selects the learning material 4, for example, as the learning material of which lecture is to be attended, from among the four learning materials, by referring to the information of the recommendable learning material (the learning material 4).

Figure 20:
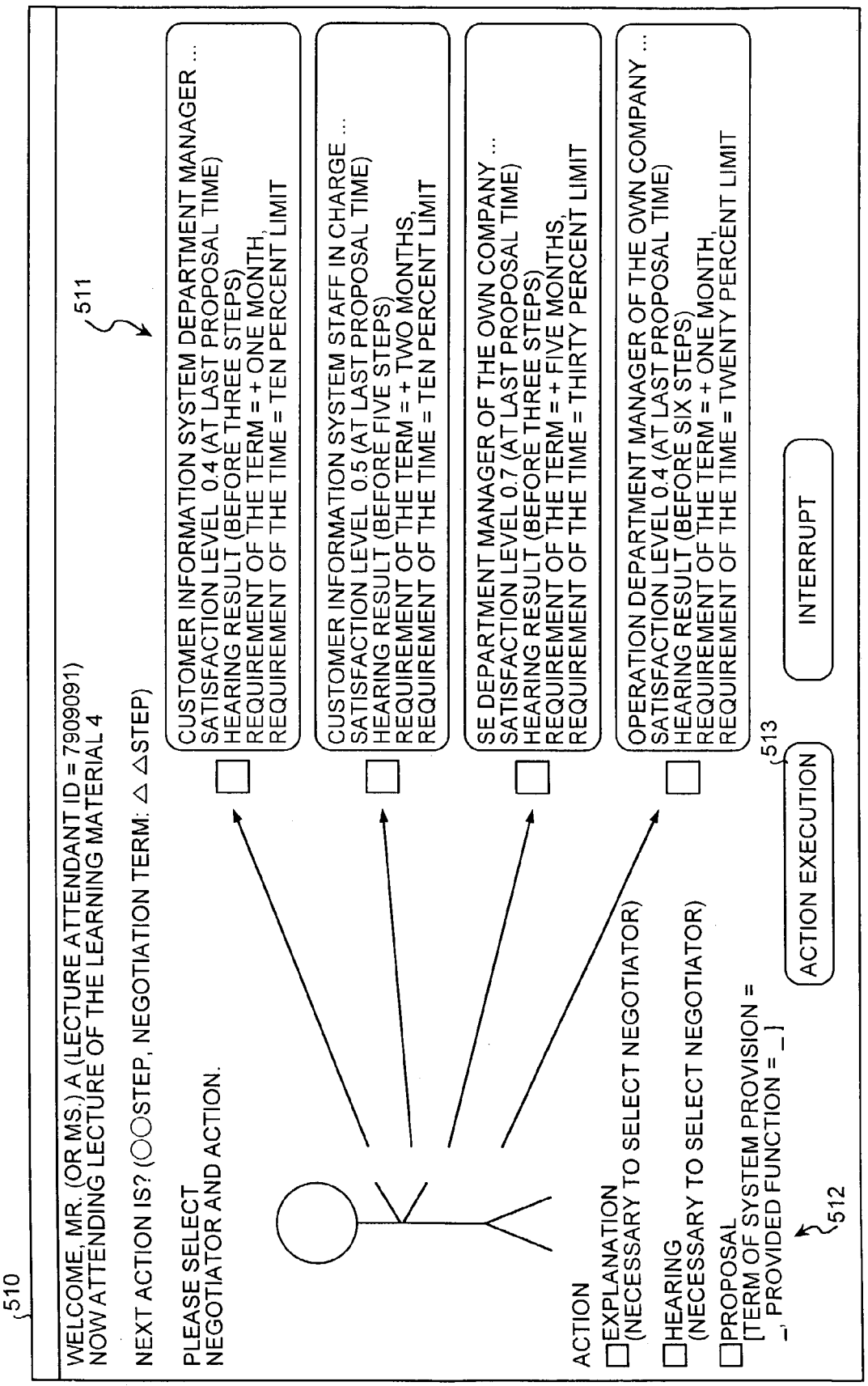
FIG. 20 shows a diagram of a lecture attendance screen 510 according to the embodiment.

At step SG5, the lecture attendance processor 105 displays the lecture attendance screen 510 shown in FIG. 20 on the display (not shown) of the lecture attendant terminal 400. Through the lecture attendance screen 510, the lecture attendant selects a negotiator and an action, and attends a lecture based on the learning material 4.

In a negotiator selecting section 511, the lecture attendant selects one person from among the pseudo four persons including the customer information system manager, the customer information system staff in charge, the SE department manager of the own company, and the sales department manager of the own company. In an action selecting section 512, the lecture attendant selects an action on the selected negotiator from among explanation, hearing, and proposal. The lecture attendant depresses an action execution button 513 after the negotiator and the action are selected in the negotiator selecting section 511 and the action selecting section 512.

Referring back to FIG. 17, at step SG6, the lecture attendance processor 105 executes a lecture attendance simulation processing. In the lecture attendance simulation processing, based on the learning material selected at step SG4, the lecture attendant (person) executes the action using the lecture attendance screen 510 (refer to FIG. 20), and each of the player agent sections $103_1$ to $103_4$ executes the player agent processing (refer to FIG. 15) corresponding to the action.

In the lecture attendance simulation processing, a processing similar to the learning material preparation processing shown in FIG. 13 is executed, except that the lecture attendant makes decision on the situation and takes action in place of the lecture attendant agent section 102.

At step SG7, the lecture attendance processor 105 decides whether the lecture attendance simulation processing has been ended. In this example, a result of the decision made at step SG7 is set "No". When the lecture attendance simulation processing has been ended, the lecture attendance processor 105 sets "Yes" as a result of the decision made at step SG7.

At step SG8, the lecture attendance processor 105 stores lecture attendance result information (lecture attendant ID, lecture attendance date, learnt learning material ID (004, in this example), and point) corresponding to the lecture attendant, in the lecture attendance result information database 260. The point indicates a number of times of actions taken from the start of the negotiation to its convergence in the lecture attendance simulation processing.

At step SG9, the lecture attendance processor 105 compares lecture attendance result information of the lecture attendant with lecture attendance result information of other lecture attendants corresponding to the same learning material. Based on this, the lecture attendance processor 105 evaluates the lecture attendance result of the lecture attendant concerned. At step SG10, the lecture attendance processor 105 displays the lecture attendance result screen 520 shown in FIG. 21 corresponding to this evaluation, on the display (not shown) of the lecture attendant terminal 400.

As explained above, according to the present embodiment, the player agents 1 to 4 (the player agent sections $103_1$ to $103_4$) and the lecture attendant agent (the lecture attendant agent section 102) carry out negotiations, corresponding to combinations of a plurality of patterns of parameters and negotiation rules. A negotiation result is evaluated for each combination. A parameter evaluated with at least a predetermined level is used as a learning material. A virtual role-playing is executed between the player agent 1 to 4 set with parameters based on the learning material and the actual lecture attendant. Therefore, the role-playing can be carried out based on parameters set properly. As a result, it is possible to increase the achievement level of the role-playing-based education.

According to the embodiment, when a complexity level of a rule is not higher than a predetermined value (which means a single rule and the number of times of convergence is equal to or higher than a threshold value: step SF3) as a result of simulation of an established negotiation, the result of evaluation of the rule is determined as a rule evaluated with at least a predetermined level, and a parameter corresponding to this rule is used as a learning material. Therefore, it is possible to provide a learning material that can increase the achievement level with a simple rule.

According to the embodiment, learning materials are ranked (elementary class, intermediate class, and advanced class) based on difficulty levels of rules. Learning materials and ranks are presented to the lecture attendant on the learning material selection screen 500 (refer to FIG. 19). Therefore, the lecture attendant can select a learning material that is most suitable for him or her.

According to the embodiment, a recommendable learning material for lecture attendance is presented based on the attributes (job experience, and lecture attendance history) of the lecture attendant. Therefore, the lecture attendant can select a learning material that is most suitable for him or her.

While the embodiment of the present invention is explained in detail with reference to the drawings, detailed structure examples are not limited to this embodiment. Any design modifications within a range not deviating from the gist of the present invention are included in the present invention.

For example, in the embodiment, the program for realizing the functions of the role-playing simulation apparatus 100 may be recorded on a computer-readable recording medium 700 as shown in FIG. 22. The program recorded on this recording medium 700 is loaded into a computer 600 shown in FIG. 22. The computer 600 executes this program to realize the functions of the role-playing simulation apparatus 100.

The computer 600 shown in FIG. 22 is composed of a CPU (central processing unit) 610 that executes this program, an input device 620 such as a keyboard and a mouse, a ROM (read-only memory) 630 that stores various kinds of data, a RAM (random access memory) 640 that stores operation parameters, a reading device 650 that reads the program from the recording medium 700, an output device 660 such as a display and a printer, and a bus 670 that connects between the devices.

The CPU 610 reads the program recorded on the recording medium 700 through the reading device 650, and executes this program. Based on this, the CPU 610 realizes the functions of the role-playing simulation apparatus 100. For the recording medium 700, it is possible to use an optical disk, a flexible disk, a hard disk, and the like.

As explained above, according to the present invention, the virtual players and the virtual lecture attendant carry out negotiations corresponding to combinations of patterns of parameters and the negotiation rules. A negotiation result for each combination is evaluated and a parameter evaluated with at least a predetermined level is used as a learning material. Therefore, the role-playing can be carried out based on the parameters set properly. Thus, it is advantageously possible to increase the achievement level of the role-playing-based education.

Moreover, when a complexity level of the negotiation rule is not higher than a predetermined value in a negotiation result of an established negotiation, the result of evaluation of the negotiation rule is determined as a rule evaluated with at least a predetermined level. A parameter corresponding to the negotiation rule is used as a learning material. Therefore, it is advantageously possible to provide the learning material that can increase the achievement level with a simple rule.

According to the present invention, when the number of times of negotiations carried out is not higher than a predetermined value in a negotiation result of an established negotiation, the result of evaluation of the negotiation rule is determined as a rule evaluated with at least a predetermined level. A parameter corresponding to the negotiation rule is used as a learning material. Therefore, it is advantageously possible to provide a learning material that can increase the achievement level with a small number of times of negotiations.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer readable recording medium recording a role-playing simulation program involving a pseudo negotiating scene, for virtual role playing and creating learning material, the program comprising:

a parameter setting unit that sets a plurality of patterns of parameters indicating attributes of a plurality of virtual players who participate in a virtual role-playing, wherein the attributes are expressed by the parameters including requirement and understanding of the virtual players;

a player agent unit that realizes the virtual players corresponding to the parameters;

a negotiation rule setting unit that sets a plurality of patterns of negotiation rules for a virtual lecture attendant who participates in the role-playing;

a lecture attendant agent unit that realizes a virtual lecture attendant who carries out negotiations with the virtual players according to the negotiation rules, wherein when the virtual lecture attendant is substituted by an actual lecture attendant using the role playing simulation program, the actual lecture attendant proceeds with negotiations, taking actions including explanation, hearing and proposal to the virtual players; and a learning material preparing unit that allows the virtual players and the virtual lecture attendant to carry out negotiations corresponding to combinations of the patterns of the parameters and the plurality of the negotiation rules, evaluates a negotiation result for each combination, and uses a parameter which scores at least a predetermined level as the learning material.

2. The computer readable recording medium according to claim 1, wherein, when a complexity level of the negotiation rule is not higher than a predetermined value in a negotiation result of an established negotiation, the learning material preparing unit determines a result of evaluation of the negotiation rule as a rule evaluated with at least a predetermined level, and a parameter corresponding to the negotiation rule as a learning material.

3. The computer readable recording medium according to claim 1, wherein, when a number of times of negotiations carried out is not higher than a predetermined value in a negotiation result of an established negotiation, the learning material preparing unit determines a result of evaluation of the negotiation rule as a result evaluated with at least a predetermined level, and a parameter corresponding to the negotiation rule as a learning material.

4. The computer readable recording medium according to claim 1, wherein the learning material preparing unit ranks learning materials based on difficulty levels of the negotiation rules, and makes the computer function as a lecture attendance unit that presents the learning materials and ranks of the learning materials to the lecture attendant to select a learning material.

5. The computer readable recording medium according to claim 4, wherein the lecture attendance unit presents a learning material that is used in a lecture recommended for attendance based on attributes of the lecture attendant.

6. A role-playing simulation apparatus which executes virtual role playing involving a pseudo negotiating scene and creates a learning material, the apparatus comprising:
 a computer-readable medium storing a database storing actual lecture attendant information including the actual lecture attendant ID, name, and job experience;
 a computer-readable medium storing program instructions for executing the virtual role playing; and
 a processor reading the instructions from the computer-readable medium and executing,
 setting a plurality of patterns of parameters indicating attributes of a plurality of virtual players who participate in the virtual role-playing, wherein the attributes are expressed by the parameters including requirement and understanding of the virtual players;

realizing the virtual players corresponding to the parameters;

setting a plurality of patterns of negotiation rules for a virtual lecture attendant who participates in the role-playing;

realizing a virtual lecture attendant who carries out negotiations with the virtual players according to the negotiation rules, wherein when the virtual lecture attendant is substituted by the actual lecture attendant when the apparatus is actually used, initializing the negotiation based upon the actual lecture attendant information in the database and the actual lecture attendant proceeding with negotiations, taking actions including explanation, hearing and proposal to the virtual players; and allowing the virtual players and the virtual lecture attendant to carry out negotiations corresponding to combinations of the plurality of the patterns of the parameters and the plurality of the negotiation rules, evaluating a negotiation result for each combination, and using a parameter which scores at least a predetermined level as the learning material.

7. A role-playing simulation method involving a pseudo negotiating scene, for virtual role playing and creating learning material, comprising:
 setting a plurality of patterns of parameters indicating attributes of a plurality of virtual players who participate in a virtual role-playing, wherein the attributes are expressed by the parameters including requirement and understanding of the virtual players;

realizing the virtual players corresponding to the parameters;

setting a plurality of patterns of negotiation rules for a virtual lecture attendant who participates in the role-playing;

realizing a virtual lecture attendant who carries out negotiations with the virtual players according to the negotiation rules wherein when the virtual lecture attendant is substituted by an actual lecture attendant in the role-playing simulation, the actual lecture attendant proceeds with negotiations, taking actions including explanation, hearing and proposal to the virtual players; and allowing the virtual players and the virtual lecture attendant to carry out negotiations corresponding to combinations of the plurality of the patterns of the parameters and the negotiation rules, evaluating a negotiation result for each combination, and using a parameter scored with at least a predetermined level as the learning material.

* * * * *

UNITED STATES PATENT AND TRADEMARK OFFICE
CERTIFICATE OF CORRECTION

| | | |
|---|---|---|
| PATENT NO. | : 7,228,260 B2 | Page 1 of 1 |
| APPLICATION NO. | : 10/355055 | |
| DATED | : June 5, 2007 | |
| INVENTOR(S) | : Akio Fujino et al. | |

It is certified that error appears in the above-identified patent and that said Letters Patent is hereby corrected as shown below:

Column 20, Line 14, change "hearing" to --hearing,--.

Column 20, Line 37, change "rules" to --rules,--.

Signed and Sealed this

Twentieth Day of November, 2007

JON W. DUDAS
*Director of the United States Patent and Trademark Office*